US011223604B2

(12) United States Patent
Chiang et al.

(10) Patent No.: US 11,223,604 B2
(45) Date of Patent: Jan. 11, 2022

(54) DETECTING AGGRESSIVE OR ATTACKING BEHAVIORS IN IMS SIP SIGNALING

(71) Applicant: T-Mobile USA, Inc., Bellevue, WA (US)

(72) Inventors: Hsin-Fu Henry Chiang, Bellevue, WA (US); Mohammed Al-Mehdar, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 276 days.

(21) Appl. No.: 16/121,249

(22) Filed: Sep. 4, 2018

(65) Prior Publication Data
US 2019/0356635 A1 Nov. 21, 2019

Related U.S. Application Data

(60) Provisional application No. 62/673,728, filed on May 18, 2018.

(51) Int. Cl.
*H04L 29/06* (2006.01)
*H04L 12/26* (2006.01)
*H04W 88/02* (2009.01)

(52) U.S. Cl.
CPC .......... *H04L 63/0281* (2013.01); *H04L 43/16* (2013.01); *H04L 63/1408* (2013.01);
(Continued)

(58) Field of Classification Search
CPC ............. H04L 63/0281; H04L 65/1006; H04L 65/1073; H04L 63/1408; H04L 43/16;
(Continued)

(56) References Cited

U.S. PATENT DOCUMENTS 8,239,554 B2 * 8/2012 Chong ................ H04L 65/1043
709/229
2004/0267939 A1 * 12/2004 Yumoto .................. H04L 67/24
709/227
(Continued)

FOREIGN PATENT DOCUMENTS

WO WO2015039281 A1 3/2015

OTHER PUBLICATIONS

The PCT Search Report and Written Opinion dated Aug. 14, 2019, for PCT Application No. PCT/US2019/031352, 11 pages.

*Primary Examiner* — Mohammed Waliullah
(74) *Attorney, Agent, or Firm* — Lee & Hayes, P.C.

(57) ABSTRACT

Systems and methods for preventing aggressive or abusing signaling on networks are disclosed. When a user equipment (UE), such as a cell phone, sends a request to a network (e.g., a REGISTER, SUBSCRIBE, or PUBLISH request), a network entity can start a "guard timer" and/or increment a "guard counter." The guard timer can comprise a predetermined amount of time within which one or more additional requests from the same UE will be ignored. Similarly, the guard timer can be used in conjunction with a guard counter. The guard counter can enable a UE to make a predetermined number of requests before the guard timer expires. If the UE exceeds the guard counter before the guard timer expires, any additional requests will be ignored. When the guard timer expires, the guard counter is reset to zero to enable the UE to make additional requests.

18 Claims, 13 Drawing Sheets

(52) U.S. Cl.
CPC ...... *H04L 65/1006* (2013.01); *H04L 65/1073* (2013.01); *H04W 88/02* (2013.01)

(58) Field of Classification Search
CPC ............. H04L 63/1466; H04L 65/1046; H04L 65/105; H04L 65/1016; H04W 88/02; H04W 12/00502; H04W 12/1204
See application file for complete search history.

(56) References Cited

U.S. PATENT DOCUMENTS

| | | | |
|---|---|---|---|
| 2009/0150544 A1* | 6/2009 | Tamura | H04L 67/325 709/224 |
| 2010/0223492 A1* | 9/2010 | Farrugia | H04L 65/1006 714/4.1 |
| 2016/0269353 A1* | 9/2016 | Chan | H04L 12/4633 |
| 2016/0345237 A1 | 11/2016 | Jain et al. | |
| 2017/0163693 A1 | 6/2017 | Skuratovich et al. | |
| 2017/0264555 A1 | 9/2017 | Yonezu | |

* cited by examiner

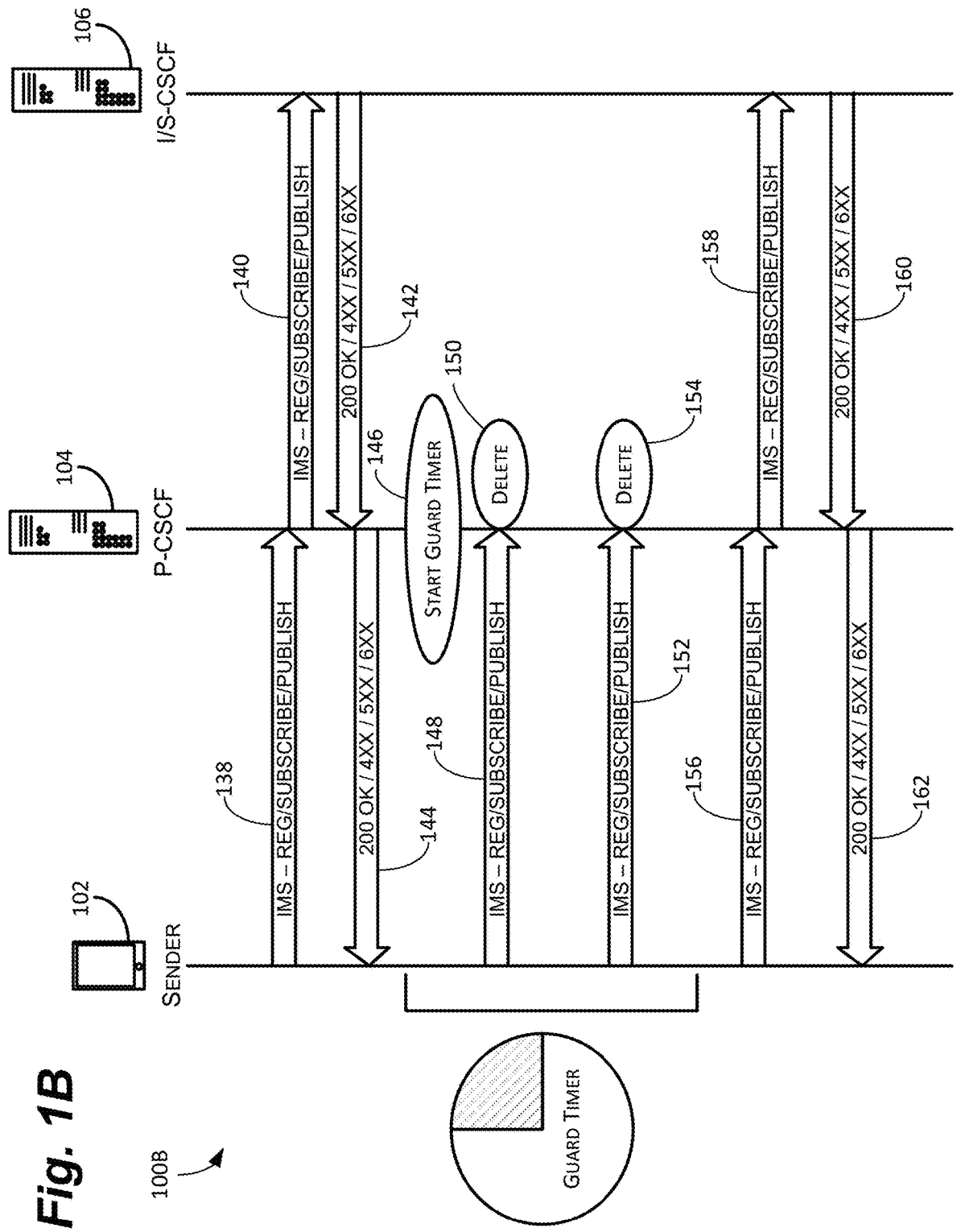

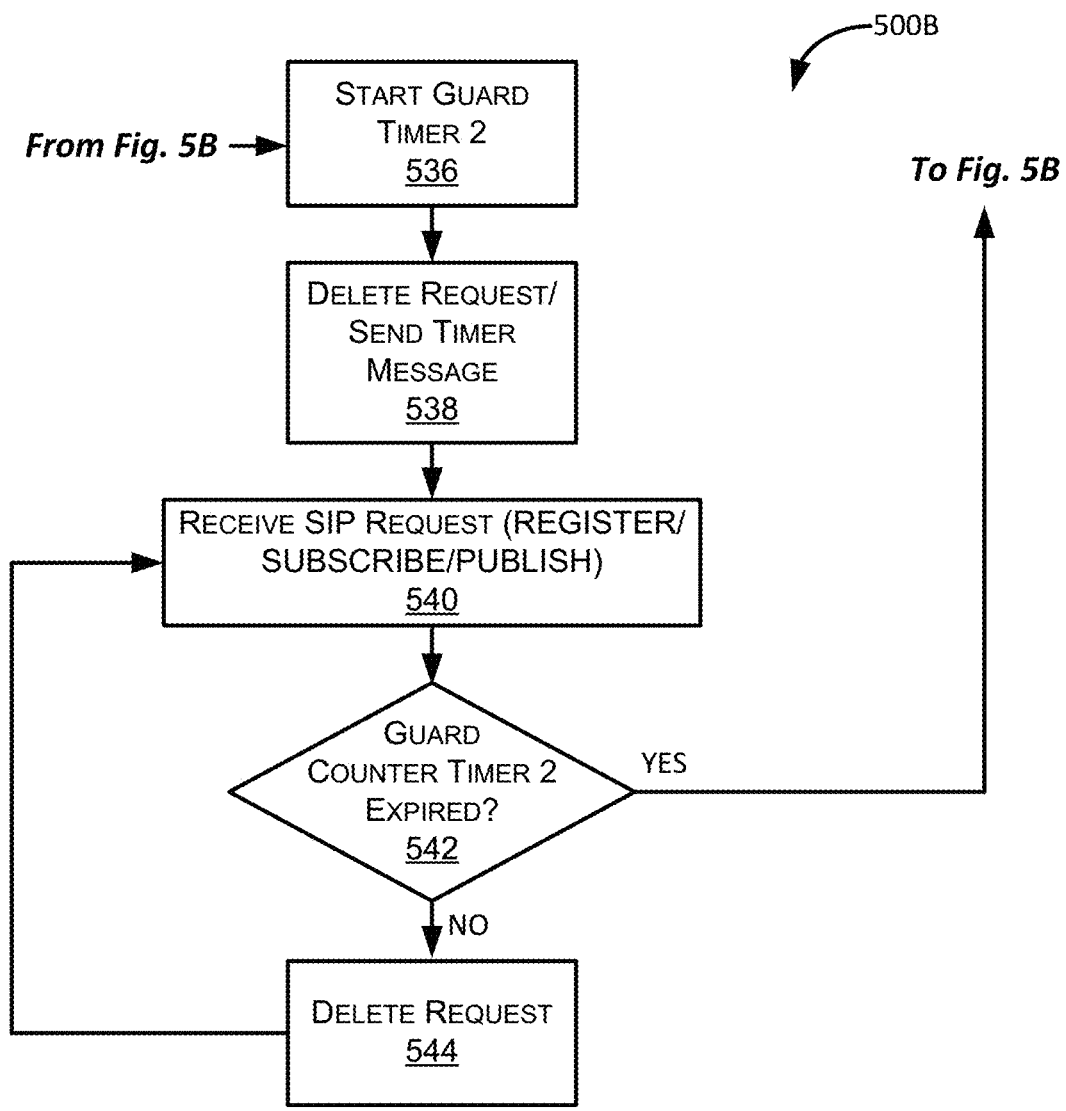

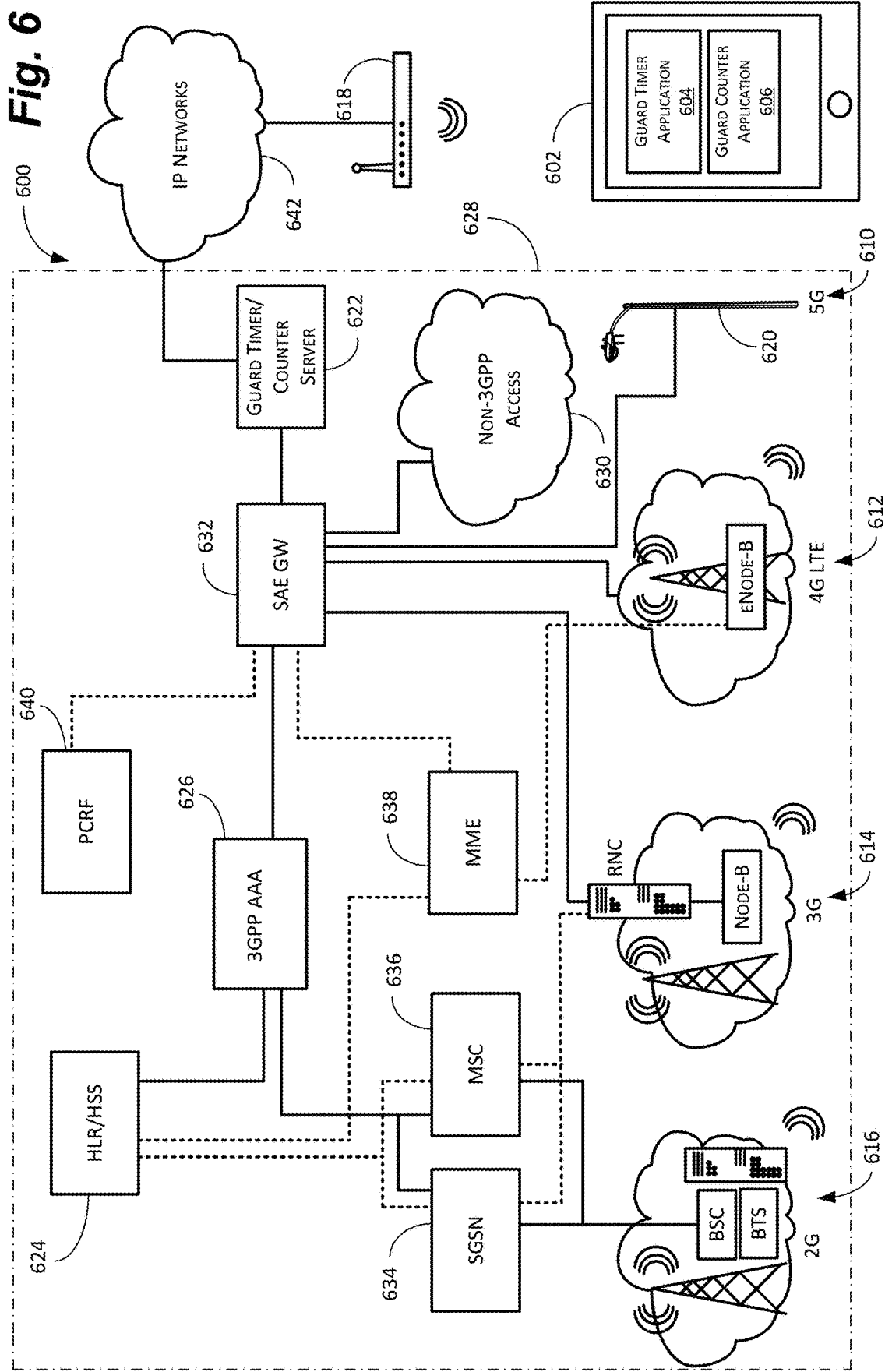

DETECTING AGGRESSIVE OR ATTACKING BEHAVIORS IN IMS SIP SIGNALING

PRIORITY CLAIM AND CROSS-REFERENCE TO RELATED APPLICATIONS

This application is a non-provisional of, and claims priority under 35 USC § 119(e) to, U.S. Provisional Patent Application No. 62/673,728, entitled, "Systems and Methods to Detect Aggressive or Attacking Behaviors in IMS SIP Signaling," filed May 18, 2018, which is fully incorporated by reference herein as if fully set forth below.

BACKGROUND

The proliferation of wireless devices that use cellular and/or Wi-Fi frequencies for cellular data and voice services has placed increased demand on cellular networks. Users check e-mail, surf the Internet, download movies, and perform other tasks on cell phones, tablet computers, laptops, and other devices (collectively, user equipment, or "UEs"). The sheer number of devices connected to a network at the same time can present significant challenges.

These challenges can be magnified significantly by UEs that aggressively signal the network. UEs can aggressively signal the network in an attempt to register with the network, for example, when one or more registration attempts fail. This aggressive signaling can be the result of malicious software (e.g., denial of service attacks) or simply due to poor software design. UEs may come from the manufacturer set to aggressively signal, for example, for improved user experience (e.g., faster connections, downloads, etc.). Regardless of the cause, even a small number of UEs signaling aggressively can place a significant strain on network resources.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 1B is an example of the system for monitoring aggressive or attacking signaling on another network entity, such as a proxy call session control function (P-CSCF), in accordance with some examples of the present disclosure.

FIGS. 5B and 5C are flowcharts depicting another example of a method for monitoring aggressive or attacking signaling using two guard timers and a guard counter, in accordance with some examples of the present disclosure.

FIG. 6 is an example of a communications network for use in conjunction with the systems and methods disclosed herein, in accordance with some examples of the present disclosure.

DETAILED DESCRIPTION

Figure 1A:
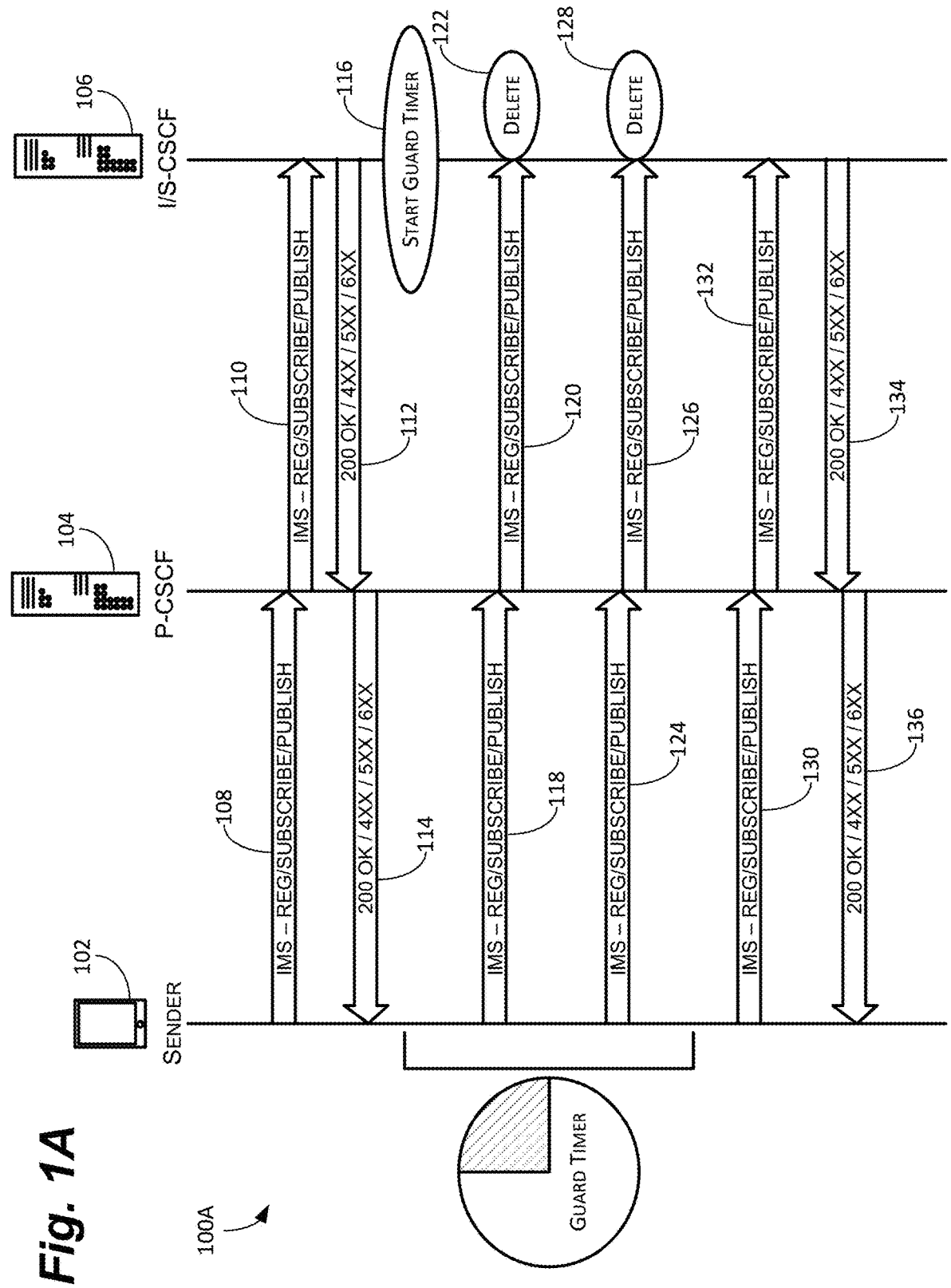
FIG. 1A is an example of a system for monitoring aggressive or attacking signaling on a network entity, such as a serving call session control function/interrogating call session control function (I/S-CSCF), in accordance with some examples of the present disclosure.

Examples of the present disclosure relate to systems and methods for detecting and ignoring aggressive or attacking signaling on communications networks. To connect to a network, a user equipment (UE) generally must first register with the network by sending a registration request to a network entity, such as a proxy call session control function (P-CSCF). To register, the UE may send, for example, a session initiation protocol (SIP) REGISTER message. If the UE is authorized to register with the network, then the network entity will register the UE and send an acknowledgement to the UE indicating a successful registration—e.g., a SIP 200 OK. If the UE is not authorized to register with the network or there is a problem with the registration—e.g., a bad password, network failure, etc.—then the network entity will send an error code based on the issue that is preventing registration (e.g., a SIP 4XX, 5XX, or 6XX code).

Regardless of whether the UE is successfully registered or not, if the UE continues to send messages to the network entity, then resources must be devoted to answering the messages. If a UE is not authorized to be registered on the network, for example, but keeps sending registration requests, then, using current methods, the network entity currently rechecks to see whether the UE is now authorized and then sends another message (e.g., either a 200 OK or an error message). Thus, a UE that is maliciously messaging the network, or simply has poorly written or malfunctioning software, can send hundreds or thousands of messages, each of which must be answered. A plurality of UEs all messaging the network repeatedly and at the same time can magnify the problem. The burden on the network can reach the point of failure and; thus, can be used in a denial of service attack, among other things.

It would be useful, therefore, to monitor the number of messages received from each UE at the network entity and to simply ignore any excessive messaging. A timer can be used, for example, to prevent a UE from sending more than one message in a predetermined amount of time. Any messages after the first message, but before the timer has expired, can simply be ignored by the network entity.

Similarly, a counter can be used in conjunction with the timer, to enable the UE to send a predetermined number of messages within a predetermined amount of time. Any messages sent before the timer expires that exceed the counter can also be ignored. Thus, the network entity is not burdened with attempting to authorize the UE, for example, or formulating and sending an appropriate response. It is to such systems and methods that examples of the present disclosure are primarily directed.

The systems and methods disclosed herein are described with respect to a cellular communications network, such as a 3G, 4G LTE, or 5G network. One of skill in the art will recognize, however, that the systems and methods are also applicable to other types of networks in which excessive signaling, such as registration requests, for example, can affect network performance when done abusively. Thus, the system is described in terms of cellular networks solely to simplify and clarify the discussion, and not to limit the disclosure.

As shown in FIG. 1A, examples of the present disclosure can comprise a system 100A for reducing aggressive or attacking signaling at the serving call session control function/interrogating call session control function (I/S-CSCF) 106. As mentioned above, on conventional systems, a UE 102 can send multiple messages, each of which will be answered by a network entity, such as a P-CSCF 104. Indeed, it does not matter whether the UE 102 is authorized to be on the network or not. A denial of service attack can come from an authorized UE 102 sending multiple registration requests—e.g., REGISTER (UE)→200 OK (network entity)→REGISTER (UE)→200 OK (network entity), etc.

In addition, some UE 102 send multiple messages in a short amount of time for legitimate purposes simply because that is the way they are programmed. When a user opens the "contacts" feature in a UE 102, for example, the UE 102 may immediately send a SUBSCRIBE request to locate every contact in the user's contacts. Because the UE 102 is concerned with the user experience and not network health, however, the UE 102 may send tens or hundreds of SUBSCRIBE messages in a matter of seconds, each of which is replied to by the network entity.

FIG. 1A depicts an example UE 102 in communication with one or more network entities, in this case, a P-CSCF 104 and an I/S-CSCF 106. For ease of explanation, these components will be referred to herein as the P-CSCF 104 and the I/S-CSCF 106; however, additional, or different, network entities could also be involved in some scenarios or on a different type of network.

At 108, the UE 102 can send a message to the P-CSCF 104. If the network is an internet multi-media subsystem (IMS) network, for example, the UE 102 can send a SIP message. The SIP message can vary based on what the UE 102 is trying to access, whether the UE 102 is already registered with the network, etc. The message can comprise, for example, a SIP REGISTER, SUBSCRIBE, PUBLISH, etc. If this is the first message between the UE 102 and the P-CSCF 104, for example, then this would generally warrant a REGISTER message. As the name implies, REGISTER is a message that enables the UE 102 to attempt to register with the network to access, for example, voice and/or data services, messaging, etc.

At 110, the P-CSCF 104 can relay the message to the I/S-CSCF 106. The I/S-CSCF 106 can verify whether, for example, the UE 102 is authorized to be on the network, whether the UE 102 is a home or roaming UE 102 and/or whether the UE 102 has provided the proper credentials (e.g., public/private keys, passwords, etc.). At 112, based on this assessment, the I/S-CSCF 106 can send a return message for the UE 102 to the P-CSCF 104. If the UE 102 is authorized to be on the network, the return message can comprise an ACK or 200 OK message, for example, acknowledging a successful registration of the UE 102 on the network.

If the UE 102 cannot be registered, the I/S-CSCF 106 can return an error message indicating why the UE 102 was not registered. These can include the 400 series of messages (referred to herein as 4XX messages), which are related to failures associated with the UE 102—e.g., the UE 102 does not have a valid roaming account, the password provided is incorrect, bad extension, etc. These can also include the 500 series messages (referred to herein as 5XX messages), which are associated with problems with the network entity—e.g., server unavailable, server time-out, etc. These can also include the 600 series of messages (referred to herein as 6XX messages), which are related to global failures such as, for example, busy everywhere or unwanted.

At 114, the P-CSCF 104 can relay the message to the UE 102. Because UEs 102 can use any message aggressively, it does not matter what message the I/S-CSCF 106 returns. In other words, the UE 102 can repeatedly send REGISTER messages even when the I/S-CSCF 106 returns a 200 OK indicating the UE 102 was successfully registered.

As a result, in some examples, regardless of the message returned, at 116, the system can start a "guard timer." The guard timer can be set to any predetermined time (e.g., 2 seconds, 5 seconds, 15 seconds, 30 seconds, etc.). If the system is merely trying to stop extremely aggressive behavior such as, for example, UEs 102 sending multiple messages per second, then a guard timer of 2 seconds may suffice. The guard timer can also be chosen based on network usage or design—e.g., there may be no legitimate reason to message more than once every 15 seconds on a particular network. In other examples, the guard timer can be set based on network traffic levels, with a shorter guard timer when traffic is light, and vice-versa. In still other examples, the guard timer can be set based on an estimated time when an issue will be resolved. If the I/S-CSCF 106 has had to reset an internet connection, for example, and this takes 35 seconds, the guard timer can be set for 35 seconds. This avoids unnecessary signaling when the message cannot currently be dealt with anyway. As shown in FIG. 1A, any messages received after the guard timer has started and before the guard timer has expired can be ignored and/or deleted.

At 118, the UE 102 can send a second message to the P-CSCF 104. As before, the message can comprise, for example, a SIP REGISTER, SUBSCRIBE, PUBLISH, etc. At 120, the P-CSCF 104 can relay the message to the I/S-CSCF 106. In this case, however, because the guard timer has not yet expired, at 122, the I/S-CSCF 106 can delete the message without responding. In some examples, if the message is the first excess message, the I/S-CSCF 106 may initially send a timer message indicating how long the UE 102 should wait to make another request (discussed below in more detail). This prevents the I/S-CSCF 106 from deciphering the message, determining whether the message is valid, contacting other network entities (e.g., a home subscriber server 624, discussed below), etc. This also eliminates the signaling associated with the I/S-CSCF 106 replying to the UE 102 via the P-CSCF 104.

At 124, the UE 102 sends yet another message to the P-CSCF 104. At 126, The P-CSCF 104 again relays the message to the I/S-CSCF 106. In this case, however, the guard timer still has not expired. As a result, at 128, the I/S-CSCF 106 can again ignore and/or delete the message instead of analyzing and responding to the message. At this point, the processing power to interpret and execute two messages and the signaling required to respond to two messages has been eliminated. This increases the available processing capacity on the network—e.g., at the P-CSCF 104 and the I/S-CSCF 106—and increases the available network bandwidth by reducing signaling. And, while only two errant messages are shown in FIG. 1A, UEs 102 with poorly designed software and/or firmware or UEs 102 with malicious intent can send tens or hundreds of messages per second. Thwarting this type of aggressive or abusive behavior from even a small number of UEs 102 can significantly improve network performance.

At 130, the UE 102 sends another message to the P-CSCF 104. At 132, The P-CSCF 104 relays the message to the I/S-CSCF 106. In this case, however, the guard timer has expired or reset. As a result, at 134, the I/S-CSCF 106 can send a response to the message. If the UE 102 was not registered before but the issue has been resolved, for example, then the I/S-CSCF 106 can send a 200 OK. Indeed, as mentioned above, the guard timer can sometimes be used to enable a problem with the network to be resolved, while eliminating fruitless messaging between the UE 102, the P-CSCF 104, and the I/S-CSCF 106. At 136, the P-CSCF 104 can relay the message to the UE 102. And, while not shown, in some examples, the message sent by the UE 102, at 130, can also restart the guard timer.

As shown in FIG. 1B, examples of the present disclosure can comprise another system 100B for reducing aggressive or attacking signaling at the P-CSCF 104. As mentioned above, on conventional systems, a UE 102 can send multiple messages, each of which will be answered by a network entity, such as a P-CSCF 104 or the I/S-CSCF 106. Because the P-CSCF 104 is located at, or near, the periphery of the network, however, reducing aggressive or attacking signaling at the P-CSCF 104 can reduce unnecessary signaling even further, including leaving the I/S-CSCF 106 out of some exchanges altogether.

To this end, at 138 the UE 102 can send a message to the P-CSCF 104. As before, if the network is an internet multi-media subsystem (IMS) network, for example, the UE 102 can send a SIP message, such as a REGISTER, SUBSCRIBE, PUBLISH, etc. At 140, the P-CSCF 104 can relay the message to the I/S-CSCF 106. The I/S-CSCF 106 can verify whether, for example, the UE 102 is authorized to be on the network, whether the UE 102 is a home or roaming UE 102, whether the UE 102 has provided the proper credentials (e.g., public/private keys, passwords, etc.). At 142, based on this assessment, the I/S-CSCF 106 can send a return message to the UE 102. If the UE 102 cannot be registered, for example, the I/S-CSCF 106 can return an error message indicating why the UE 102 was not registered. At 144, the P-CSCF 104 can relay the message to the UE 102.

Regardless of the message returned, at 146, the system 100B can start a guard timer. The guard timer can be set to any predetermined time (e.g., 2 seconds, 5 seconds, 15 seconds, 30 seconds, etc.). Of course, the guard timer could be started at a slightly different time. In some examples, the guard timer can start as soon as the initial message, at 138, is received from the UE 102 at the P-CSCF 104. In other examples, the guard timer could be started when the P-CSCF 104 receives the return message from the I/S-CSCF 106, at 142. In still other examples, the guard timer can start after the return message is received from the I/S-CSCF 106 at the P-CSCF 104, at 142, but before the P-CSCF 104 relays the message to the UE 102, at 144. Regardless, any messages received after the guard timer has started and before the guard timer has expired can be ignored and/or deleted.

At 148, the UE 102 can send another message to the P-CSCF 104. As before, the message can comprise, for example, a SIP REGISTER, SUBSCRIBE, PUBLISH, etc. In this case, however, because the guard timer has not yet expired, at 150, the P-CSCF 104 can delete the message without responding. This prevents additional signaling to the I/S-CSCF 106 and prevents the I/S-CSCF 106 from deciphering the message, determining whether the message is valid, contacting other network entities, etc. This also eliminates the signaling associated with the I/S-CSCF 106 replying to the UE 102 via the P-CSCF 104.

At 152, the UE 102 sends yet another message to the P-CSCF 104. At 154, because the guard timer has still not expired, the P-CSCF 104 can again ignore and/or delete the message instead of forwarding, analyzing, and/or responding to the message. At this point, the system 100B has prevented two additional messages between the P-CSCF 104 and the I/S-CSCF 106, saved the processing power needed to interpret and execute two messages, and eliminated the signaling from the P-CSCF 104 to the UE 102 required to respond to two messages. And, while only two errant messages are shown in FIG. 1B, any additional messages received prior to the expiration of the guard timer can also be ignored and/or deleted.

At 156, the UE 102 sends another message to the P-CSCF 104. In this case, however, the guard timer has expired or reset. As a result, at 158, the P-CSCF 104 relays the message to the I/S-CSCF 106. At 160, the I/S-CSCF 106 can send a response to the message to the UE 102. If the UE 102 was not registered before, but the issue has been resolved, for example, the I/S-CSCF 106 can send a 200 OK. If the issue has still not been resolved (whatever it is), the I/S-CSCF 106 can send an error message. At 162, the P-CSCF 104 can relay the message to the UE 102. And, while not shown, in some examples, the message sent by the UE, at 154, can also restart the guard timer.

Figure 2:
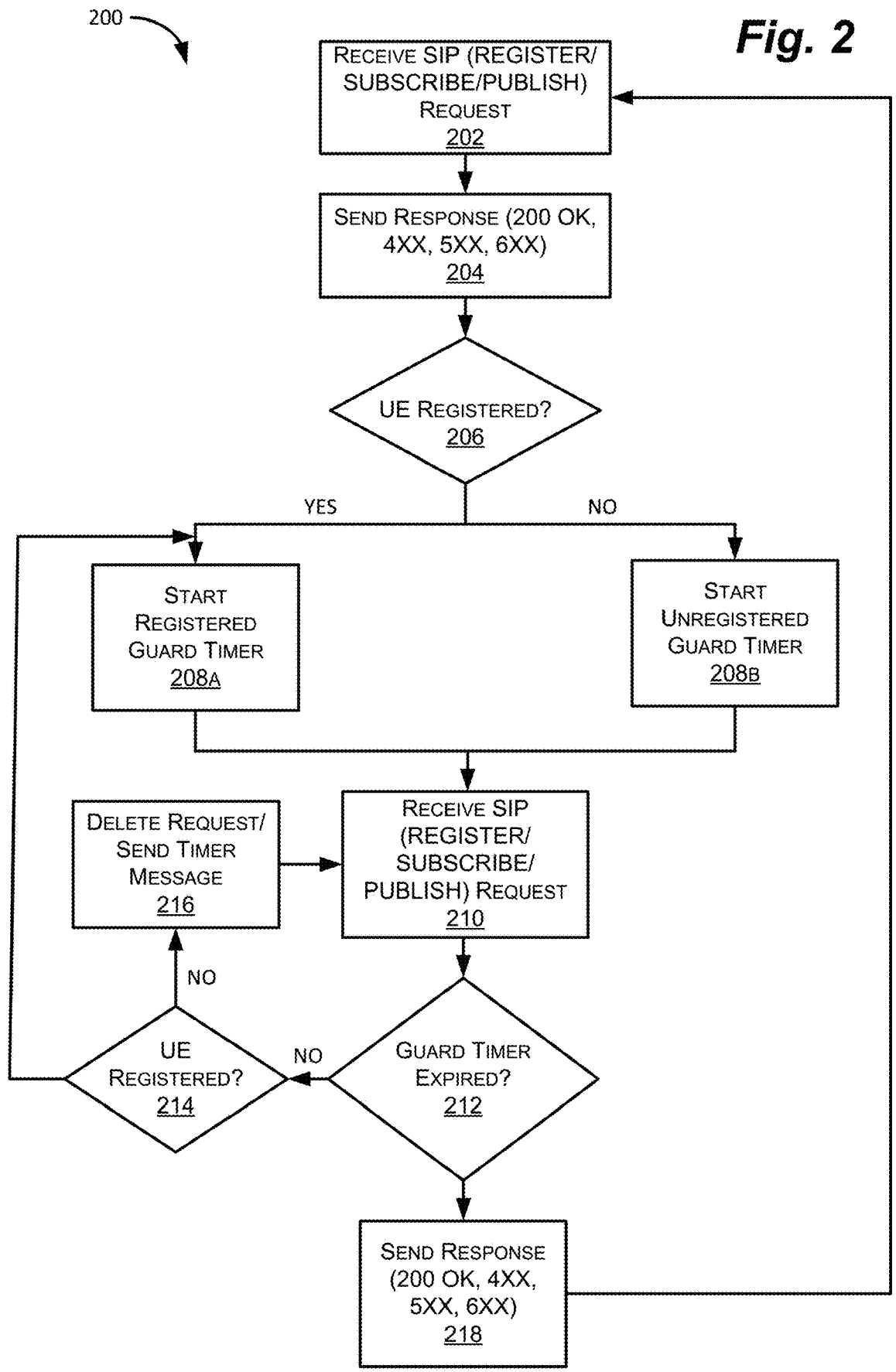
FIG. 2 is a flowchart depicting an example of a method for monitoring aggressive or attacking signaling using a registered guard timer and an unregistered guard timer, in accordance with some examples of the present disclosure.

As shown in FIG. 2, examples of the present disclosure can also comprise a method 200 for eliminating aggressive or attacking messaging using two different guard timers—one for registered UE and one for unregistered UE. In some cases, it may be necessary for UEs to send multiple messages to complete a series of events. A UE may send a REGISTER message to attach to the network, for example, and then send a SUBSCRIBE message to be connected to a telephony application server (TAS) for a particular service or application. To this end, it may be desirable to have a different, shorter, guard timer for registered users when compared to the guard timer for unregistered users. In this manner, unauthorized UE repeatedly messaging the network are ignored for a longer period of time, reducing their effect on the network.

At 202, the network entity (e.g., the P-CSCF or S-CSCF) can receive a first message from a UE. As before, the message can comprise a REGISTER, SUBSCRIBE, PUBLISH, or some other message depending on what the UE (or the user) is trying to accomplish.

At 204, the network entity can send the appropriate response. As before, the response can be either a 200 OK—indicating that the UE has been registered on the network—or an error code—indicating that the UE has not been registered. In some examples, the error code can also include a reason why the UE was not registered.

At 206, the network entity can determine, based at least in part on the response, whether the UE has been registered or not. If the network entity sent an ACK or 200 OK, for example, then the UE can be determined to be registered. If the network entity sent an error message, on the other hand, then the UE can be determined to be unregistered.

If the UE is registered, then at 208a, the network entity can start a registered guard timer. If the UE is not registered, on the other hand, then at 208b, the network entity can start an unregistered guard timer. In some examples, the registered guard timer can be shorter than the unregistered guard timer. This can enable registered UE to REGISTER and then SUBSCRIBE, for example, within a reasonable amount of time (e.g., within 1 or 2 seconds), yet prevent aggressive messaging (e.g., sending ten SUBSCRIBE messages per second for every contact in the UE).

The unregistered guard timer, on the other hand, can be longer to prevent unregistered UE from attacking the network with unwarranted messages. So, if a UE sends a REGISTER message and is not registered, for example, then the unregistered guard timer may be set to 15 or 30 seconds. In this manner, the rate at which the unregistered UE can message the network is reduced from potentially multiple times a second to once every 15 or 30 seconds. This can substantially reduce the burden on the network caused by overly aggressive or attacking behavior.

Regardless of which guard timer is appropriate, at 210, the network entity can receive another message from the UE. At 212, the network entity can determine if the guard timer has expired. If the guard timer has not expired, then at 214, the network entity can determine if, between the time of receiving the request and the current time, the UE has become registered. This may be because they registration of the UE was delayed slightly or the UE initially provided incorrect credentials, but had now provided correct credentials.

Regardless, if the UE has now been registered, then at 208a, the method 200 can stop/cancel the unregistered guard time and start the registered guard timer. This may reduce the amount of time Suring which the (now registered) UE is ignored. If the registered guard timer is 5 seconds and the unregistered guard timer is 30 seconds, for example, then a UE that becomes registered within 5 seconds will be ignored for only 10 total seconds (5 seconds to register and 5 seconds for the registered guard timer to expire).

If the UE has still not been registered, on the other hand, then at 216, the network entity can simply delete or ignore the message. Thus, it is not necessary for the network entity to read, interpret, analyze, answer, or do anything else with the message. In this manner, the processing power and signaling traffic associated with answering the message is eliminated.

In some examples, in addition to, or instead of, simply deleting the request, at 216, the network entity can send a timer message to the UE. The timer message can indicate to the UE the amount of time left on the guard timer. The network entity can send a 4XX message, for example, that essentially says, "Stop pinging the network for 10 seconds" (or whatever the guard timer is set to, or whatever time remains on the guard timer). For SIP messaging, this can be done using a RETRY-AFTER header including the amount of time left on the guard timer. For UE that are responsive (e.g., UE that are not acting maliciously or malfunctioning), this may reduce or eliminate signaling from both the UE side and the network side until the guard time expires.

The timer message can also enable the network to delay the UE until a network issue—for which an estimated time of resolution is known—can be resolved. If a network server is rebooting and will be back up in 15 seconds, for example, the timer message can tell the UE to stop pinging the network for 15 seconds until the issue is resolved. In some examples, the network entity may use a different error code in each case—a first error code (e.g., 4XX) for aggressive or abusive behavior on the part of the UE and a second error code (e.g., 5XX) for a network issue with a known resolution time. Of course, for malicious or malfunctioning UE, the guard timer serves to ignore or delete any messages received in the meantime.

At 218, if the guard timer has expired on the other hand, then the network entity can return to "normal" operation and send another response, as appropriate. Thus, if the previous issue has been resolved (regardless of the source), for example, the network entity can register the UE and send a 200 OK. If an issue still exists that prevents the UE 102 from being registered, then the network entity can send another error message. If the UE sends yet another request, then at 202, the method 200 repeats.

It should be noted that, while the steps are depicting in FIG. 2 in a particular order, the disclosure is not so limited. The method 200 could, for example, determine whether the UE is registered, start the appropriate guard timer, and then send a response (essentially, in order, steps 202, 206, 208A/208B, 204, 210 etc.). In other words, the guard timer can be started in response to the initial message, after the first response is sent, or at a slightly different time. Thus, the order shown in FIG. 2, and discussed above, is intended to be explanatory and not limiting.

Figure 3A:
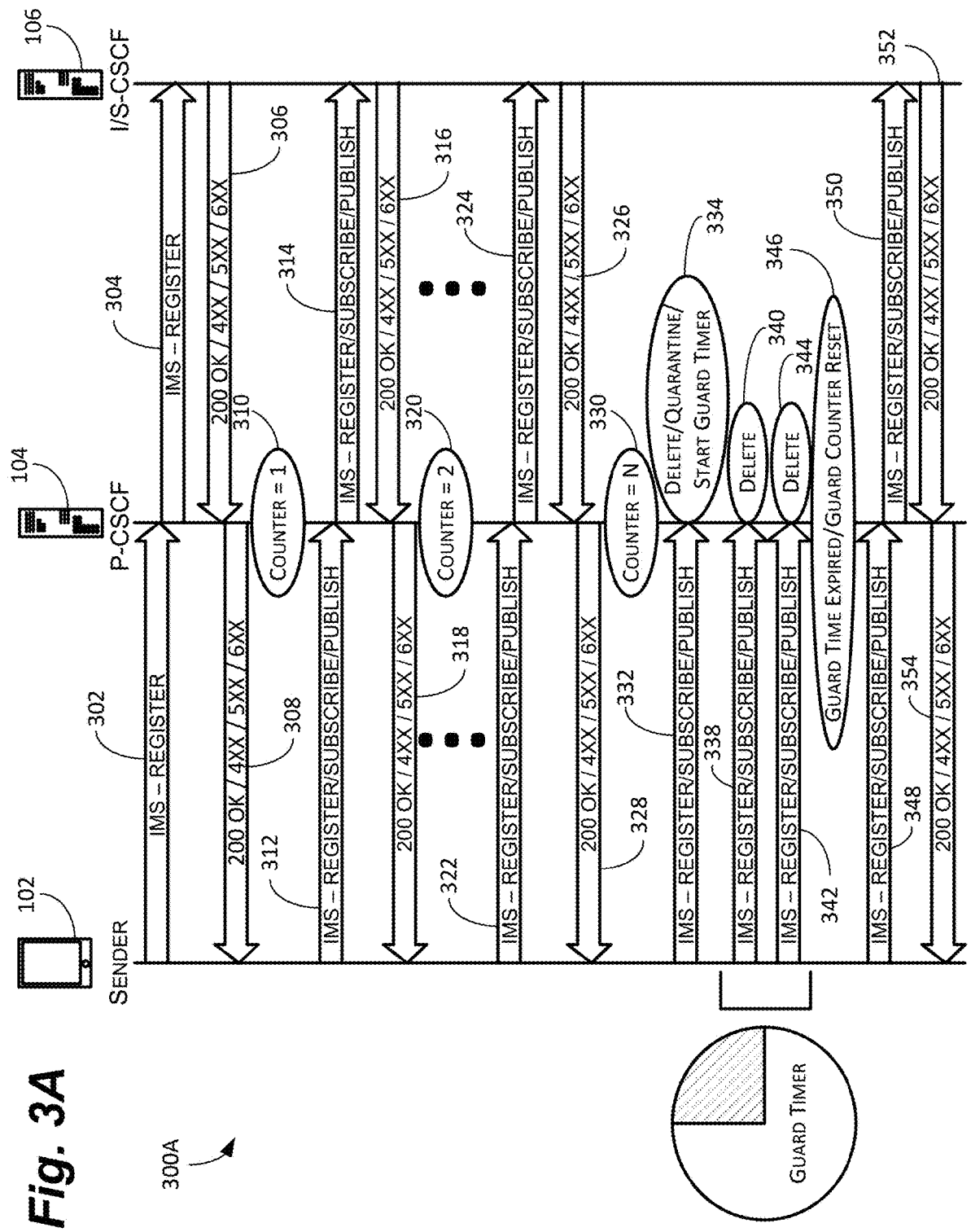
FIG. 3A is an example of a system for monitoring aggressive or attacking signaling using a guard counter and then a guard timer, in accordance with some examples of the present disclosure.

FIG. 3A depicts a system 300A that includes a guard counter and a guard timer to control aggressive or abusive messaging on the network. As above, FIG. 3A depicts the UE 102 in communication with the P-CSCF 104 and the I/S-CSCF 106. Of course, in some examples, different, more, or less network components could be implemented.

FIG. 3A depicts a guard counter used in conjunction with a guard timer. At 302, the UE 102 can send a message to the P-CSCF 104. If the UE 102 has not registered with the network yet, for example, then the message may comprise a SIP REGISTER. Of course, the UE 102 can send any number of messages depending on its current status, a service or application requested by the user, etc. At 304, the P-CSCF 104 can relay the message to the I/S-CSCF 106.

If the UE 102 is authorized to be registered with the network, for example, then at 306, the I/S-CSCF 106 can send an ACK or a 200 OK indicating a successful registration. If the UE 102 is not authorized, on the other hand, then, at 306, the I/S-CSCF 106 can send an error message. At 308, the P-CSCF 104 can relay the message to the UE 102.

At 310, a guard counter is also incremented by one (Counter=1), indicating that the UE 102 has sent one of its quota of messages. The guard counter enables the UE 102 to send a predetermined number of messages before a guard timer is implemented. So, for example, if the guard counter is set to five and the guard timer is set for 30 seconds, then the UE 102 can send five messages, but then has to wait 30 seconds to send another five messages.

In some examples, the guard timer and/or the guard counter can be different for registered and unregistered users. So, in this example, if the UE 102 was successfully registered with the network, the guard counter can be set to five, for example, and the guard timer can be set to five seconds. For unregistered UE 102, on the other hand, the guard counter can be set to one or two, for example, and the guard timer can be set to 15 or 30 seconds. This further reduces the impact of aggressive or attacking behavior from unregistered devices.

In some examples, to detect aggressive or attacking behavior, the I/S-CSCF 106 can use the guard time and guard counter in conjunction with one or more SIP 401 challenges—which require UE authorization—and 407 responses—the response provided by the I/S-CSCF 106 when the UE 102 provides invalid credentials. If the UE 102 continues to provide invalid credentials in response to the 401/407 challenge, this can be considered attacking behavior.

In this case, the I/S-CSCF 106 can provide a SIP 401 challenge to the UE 102 requesting a "secret key" (e.g., an authorized public/private key). If the UE 102 provides invalid credential in response to the SIP 401 challenge, this prompts a SIP 407 from the I/S-CSCF 106 to the UE 102. In this case, each SIP 407 can increase the guard counter by 1. As before, if the guard counter is exceeded, then the P-CSCF 104 can stop forwarding additional requests until the guard timer expires. This prevents UEs 102 that are obviously "guessing," malfunctioning, or out of date from consuming excessive resources. For security reasons, this also significantly slows the process of the UE 102 trying to figure out how to answer 401/407 correctly. In other words, an authorized UE 102 should already know the secret key.

At 312, the UE 102 can send a second message to the P-CSCF 104. At 314, since the guard counter has not been exceeded, the P-CSCF 104 can relay the message to the I/S-CSCF 106. At 316, the I/S-CSCF 106 can send an appropriate response to the P-CSCF 104. At 318, the P-CSCF 104 can relay the message to the UE 102. At 320, the guard counter can also be incremented by one (Counter=2). At 322-330, this process can be repeated until the guard counter is met (Counter=N). If the guard counter is set to five, for example, then N=5.

At 332, the UE 102 sends yet another message to the P-CSCF 104. Because this message exceeds the guard counter, however, at 334, the P-CSCF 104 deletes or ignores the message. At the same time, the network starts the guard timer. In some examples, the network can also place the UE 102 (e.g., the IP address or phone number of the UE 102) on a quarantine list until the guard timer has expired. In other examples, as mentioned above, the network may also send a timer message to indicate to the UE 102 the amount of time left on the guard timer. The network entity can send a 4XX message, for example, that essentially says, "Stop pinging the network for 5 seconds" (or whatever the guard timer is set to, or whatever time that remains on the guard timer).

At 338, the UE 102 sends another message to the P-CSCF 104. At 340, because the guard timer has not yet expired, the P-CSCF 104 ignores or deletes the message from the UE 102. At 342, the UE 102 sends yet another message to the P-CSCF 104. At 344, because the guard timer still has not expired, the P-CSCF 104 again ignores or deletes the message from the UE 102. Indeed, regardless of how many messages the UE 102 sends, the P-CSCF 104 ignores or deletes all messages until the guard timer expires.

In this case, the P-CSCF 104 is configured to track the guard counter and the guard timer and ignore or delete messages, as appropriate. As above, however, in other examples, the IS-CSCF 106 (or another network entity) can perform these functions. This configuration may result in some additional signaling traffic, but may be advantageous depending on the network configuration (e.g., the P-CSCF 104 may be more heavily loaded than the I/S-CSCF 106).

At 346, the guard timer expires and can be reset, which can also reset the guard counter. At 348, the UE 102 can send yet another message to the P-CSCF 104. At 350, because the guard counter and the guard timer have been reset, however, the P-CSCF 104 can relay the message to the I/S-CSCF 106. And, while only one additional message is shown, in reality, the UE 102 is again free to send as many messages as allowed by the guard counter. At 352, the I/S-CSCF 106 can send the appropriate reply to the P-CSCF 104. At 354, the P-CSCF 104 can relay the message to the UE 102.

In this example, therefore, the UE 102 is able to send as many messages as the guard counter allows, then must wait for the guard timer to expire, then can send another set of messages. If the guard counter is set to five, for example, and the guard timer is set to 15 seconds, then the pattern can be—5 messages→15 second delay→5 messages→15 second delay, etc. Of course, the guard timer and guard counter can be different for different UE 102 (e.g., registered vs. unregistered), different error codes (e.g., 4XX vs. 6XX), or using some other parameter. In some examples, the guard counter can be decreasing and/or the guard counter can be increasing. If a UE 102 is repeatedly messaging the P-CSCF 104, but is repeatedly being sent one or more error codes, then the pattern can be, for example—5 messages→15 second delay→3 messages→30 second delay, etc.

Figure 3B:
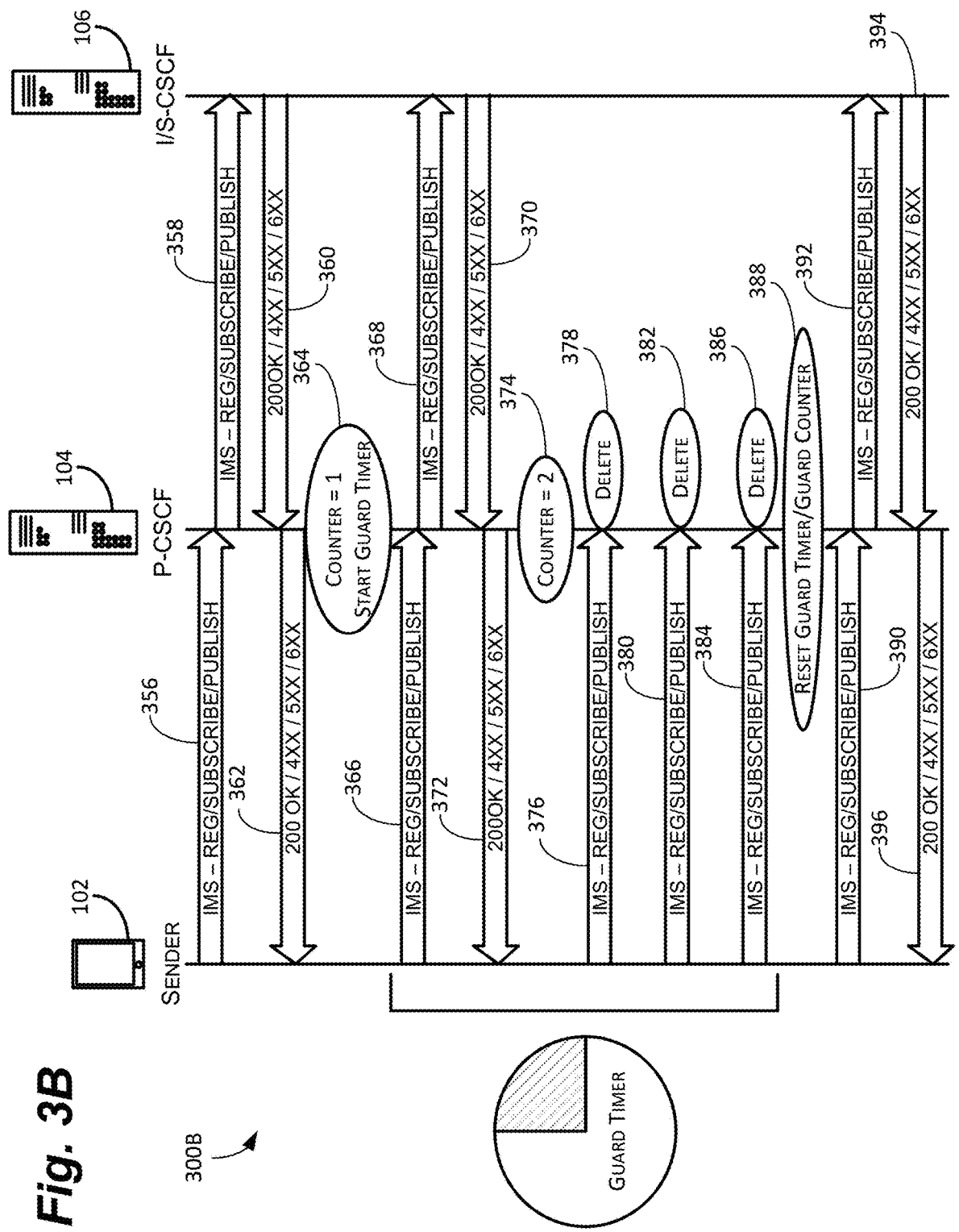
FIG. 3B is an example of the system for monitoring aggressive or attacking signaling using a guard counter in conjunction with a guard timer, in accordance with some examples of the present disclosure.

As shown in FIG. 3B, examples of the present disclosure can also comprise a system 300B including a guard timer and a guard counter, which can be used to limit the number of messages a UE 102 can send within a predetermined amount of time. Instead of allowing 5 messages (at any rate) and then delaying 15 seconds, for example, the UE 102 can be limited to sending one message every second, for example, or five messages every 15 seconds. In this configuration, the guard timer and the guard counter are initiated in response to the first message being sent, as described below.

At 356, the UE 102 can send a message to the P-CSCF 104. At 358, the P-CSCF 104 can relay the message to the I/S-CSCF 106. If the UE 102 is authorized to be registered with the network, for example, then at 360, the I/S-CSCF 106 can send an ACK or a 200 OK indicating a successful registration. If the UE 102 is not authorized, on the other hand, then, at 360, the I/S-CSCF 106 can send an error message. Regardless, at 362, the P-CSCF 104 can relay the message to the UE 102.

At 364, in response to the first message, the guard counter is also incremented by one (Counter=1), indicating that the UE 102 has sent one of its quota of messages, and the guard timer is started. The guard counter enables the UE 102 to send a predetermined number of messages before the guard timer expires. So, for example, if the guard counter is set to five and the guard timer is set for 30 seconds, then the UE 102 can send five messages within 30 seconds. A sixth message with that 30 seconds, however, will be ignored or deleted. As mentioned above, the guard time may be started and/or the guard counter can be incremented in response to another related action (e.g., when the request is initially received, at 358).

As before, in some examples, the guard timer and/or the guard counter can be different for registered and unregistered users. So, in this example, if the UE 102 was successfully registered with the network, the guard counter can be set to five, for example, and the guard timer can be set to five seconds. For unregistered UE 102, on the other hand, the guard counter can be set to one or two, for example, and the guard timer can be set to 15 or 30 seconds. This further reduces the impact of aggressive or attacking behavior from unregistered devices.

In this example, the UE 102 is not registered, the guard counter is set to two, and the guard timer is set to 30 seconds. At 366, the UE 102 can send a second message to the P-CSCF 104. At 368, since the guard counter has not been exceeded, the P-CSCF 104 can relay the message to the I/S-CSCF 106. At 370, the I/S-CSCF 106 can send an appropriate response to the P-CSCF 104. At 372, the P-CSCF 104 can relay the message to the UE 102. At 374, the guard counter can also be incremented by one (Counter=2).

At 376, the UE 102 sends a third message to the P-CSCF 104. Because this message exceeds the guard counter, however, at 378, the P-CSCF 104 deletes or ignores the message. In some examples, the network can also place the UE 102 (e.g., the IP address or phone number of the UE 102) on a quarantine list until the guard timer has expired. In other examples, for the initial message in excess of the guard counter, the P-CSCF 104 can also a timer message. The timer message can essentially say, "Stop pinging the system for X seconds," where X is equal to the amount of time remaining on the guard timer.

At 380, the UE 102 sends a fourth message to the P-CSCF 104. At 382, because the guard timer has not yet expired, the P-CSCF 104 again ignores or deletes the message from the UE 102. At 384, the UE 102 sends a fifth message to the P-CSCF 104. At 386, because the guard timer still has not expired, the P-CSCF 104 again ignores or deletes the messages from the UE 102. Indeed, regardless of how many messages the UE 102 sends, the P-CSCF 104 ignores or deletes all messages until the guard timer expires.

In this case, the P-CSCF 104 is configured to track the guard counter and the guard timer and ignore or delete messages, as appropriate. As above, however, in other examples, the I/S-CSCF 106 (or another network entity) can perform these functions. This configuration may result in some additional signaling traffic, but may be advantageous depending on the network configuration (e.g., the P-CSCF 104 may be more heavily loaded than the I/S-CSCF 106).

At 388, the guard timer expires and can be reset, which can also reset the guard counter. At 390, the UE 102 can send yet another message to the P-CSCF 104. At 392, because the guard counter and the guard timer have been reset, however, the P-CSCF 104 can relay the message to the I/S-CSCF 106. At 394, the I/S-CSCF 106 can send the appropriate reply to the P-CSCF 104. At 396, the P-CSCF 104 can relay the message to the UE 102.

In this example, therefore, the UE 102 is able to send as many messages as the guard counter allows until the guard timer expires or resets and then can send another set of messages. If the guard counter is set to five, for example, and the guard timer is set to 15 seconds, then the UE 102 can send no more than five messages in the first 15 seconds, no more than five messages in the second 15 seconds, etc. Of course, in reality, the system 300B would act to prevent any 5 messages in any 5 second period. As before, the guard timer and guard counter can be different for different UE 102 (e.g., registered vs. unregistered), different error codes (e.g., 4XX vs. 6XX), or using some other parameter. In some examples, the guard counter can be decreasing and/or the guard counter can be increasing. If a UE 102 is repeatedly messaging the P-CSCF 104, but is repeatedly being sent one or more error codes, then the UE 102 may be reduced to one message every 15 seconds, for example.

Figure 4:
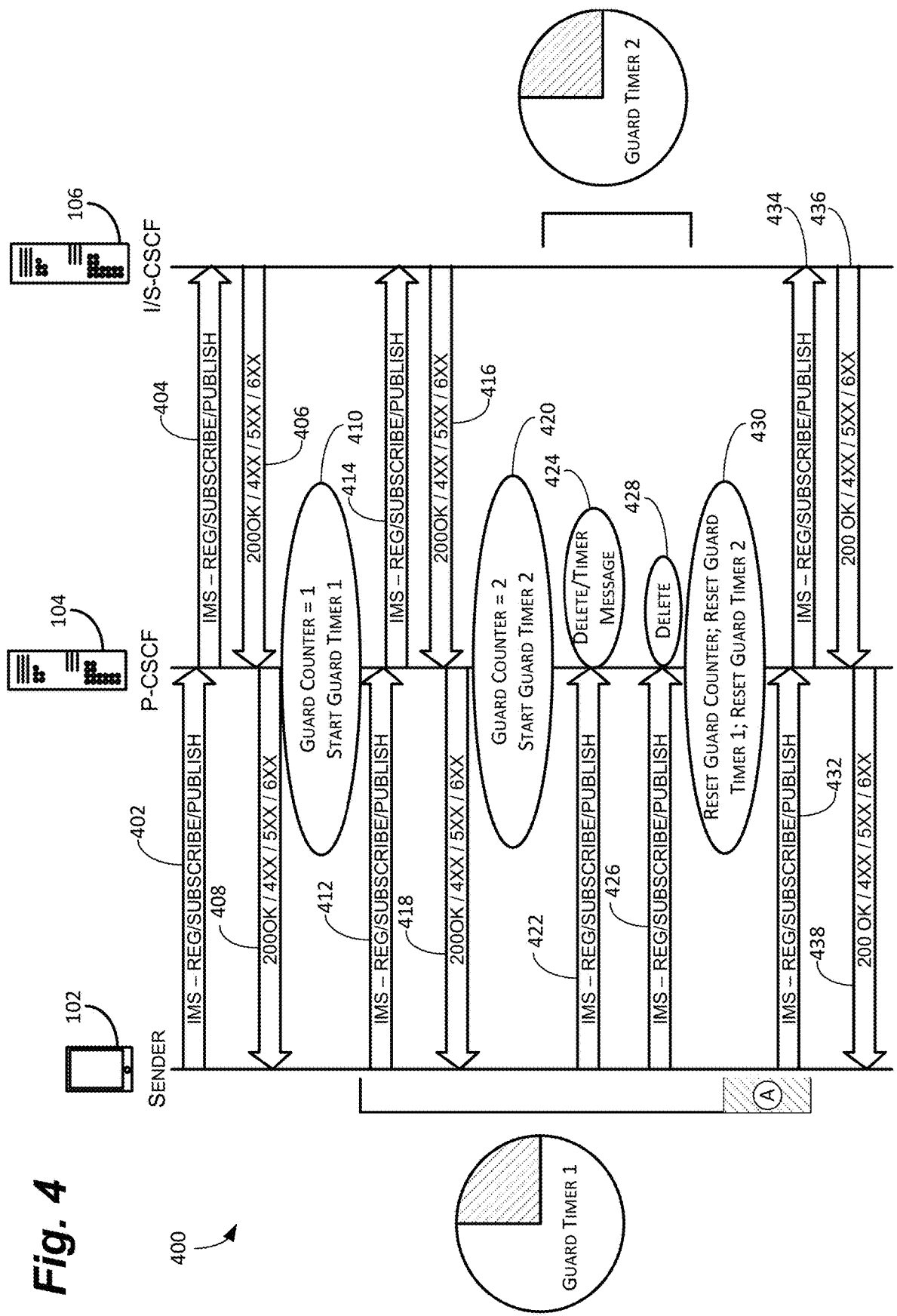
FIG. 4 is an example of the system for monitoring aggressive or attacking signaling using two guard timers in conjunction with a guard counter, in accordance with some examples of the present disclosure.

As shown in FIG. 4, examples of the present disclosure can also include a system 400 that includes a guard counter and two guard timers—guard timer 1 and guard timer 2. In this configuration, guard timer 1 and the guard counter can be used to monitor the number of messages sent by the UE 102 in any given period of time. If the guard counter is exceeded, then guard timer 2 is started. Until guard timer 2 expires, all additional messages from the UE 102 can be deleted or ignored by the network. When guard timer 2 expires, then both guard timers and the guard counter can be reset, allowing further messaging.

At 402, the UE 102 can send a message to the P-CSCF 104. At 404, the P-CSCF 104 can relay the message to the I/S-CSCF 106. If the UE 102 is authorized to be registered with the network, for example, then at 406, the I/S-CSCF 106 can send an ACK or a 200 OK indicating a successful registration. If the UE 102 is not authorized, on the other hand, then, at 406, the I/S-CSCF 106 can send an error message. Regardless, at 408, the P-CSCF 104 can relay the message to the UE 102.

At 410, in response to the first message, the guard counter is also incremented by one (Counter=1), indicating that the UE 102 has sent the first of its quota of messages, and guard timer 1 is started. The guard counter enables the UE 102 to send a predetermined number of messages before guard timer 1 expires. So, for example, if the guard counter is set to five and guard timer 1 is set for 30 seconds, then the UE 102 can send five messages within 30 seconds. A sixth message with that 30 seconds, however, will start guard timer 2 (discussed below) and messages from the UE 102 will be ignored or deleted until guard timer 2 expires.

As before, in some examples, the guard timer(s) and/or the guard counter can be different for registered and unregistered users. So, in this example, if the UE 102 was successfully registered with the network, the guard counter can be set to five, for example, guard timer 1 can be set to five seconds, and guard timer 2 can be set to five seconds. For unregistered UE 102, on the other hand, the guard counter can be set to one or two, for example, guard timer 1 can be set to 30 seconds, and guard timer 2 can be set to 15 seconds. This further reduces the impact of aggressive or attacking behavior from unregistered devices.

For this example, the UE 102 is not registered, the guard counter is set to two, guard timer 1 is set to 30 seconds, and guard timer 2 is set to 15 seconds. At 412, the UE 102 can send a second message to the P-CSCF 104. At 414, since the guard counter has not been exceeded, the P-CSCF 104 can relay the message to the I/S-CSCF 106. At 416, the I/S-CSCF 106 can send an appropriate response to the P-CSCF 104. At 418, the P-CSCF 104 can relay the message to the UE 102. At 420, the guard counter can also be incremented by one (Counter=2), which in this case starts guard timer 2—i.e., the UE 102 has sent the two messages it is allowed to send before guard timer 1 expires in 30 seconds. Guard timer 2 is now started, during which any additional messages from the UE 102 will be ignored.

At 422, the UE 102 sends a third message to the P-CSCF 104 within 15 seconds of starting guard timer 2. Because guard timer 2 has not expired, however, at 424, the P-CSCF 104 deletes or ignores the message. In some examples, the network can also place the UE 102 (e.g., the IP address or phone number of the UE 102) on a quarantine list until the guard timer has expired. In some examples, for the first additional message, at 424, the P-CSCF 104 can also send a timer message—e.g., "Stop pinging the network for 10 seconds." The message can include the amount of time remaining before guard timer 2 expires, for example. If the UE 102 is functioning properly, this may reduce signaling on both the network side and the UE 102 side.

At 426, the UE 102 sends a fourth message to the P-CSCF 104 within 15 seconds of starting guard timer 2. At 428, because guard timer 2 has not yet expired, the P-CSCF 104 ignores or deletes the message from the UE 102. In this case, the P-CSCF 104 likely would not send another timer message. It is evident from the fourth message that the UE 102 is either acting maliciously or malfunctioning. As a result, additional messaging is unlikely to be effective.

At 430, guard timer 2 expires. As a result, the guard counter, guard timer 1, and/or guard timer 2 can be reset. In this example, both guard timers are reset and, at 432, the UE 102 sends a fifth message to the P-CSCF 104. Because both guard timers and the guard counter have been reset, at 434, the P-CSCF 104 can relay the message to the I/S-CSCF 106. If the UE 102 is now authorized to be registered with the network, then at 436, the I/S-CSCF 106 can send an ACK or a 200 OK indicating a successful registration. If the UE 102 is still not authorized, on the other hand, then, at 436, the I/S-CSCF 106 can send another error message. Regardless, at 438, the P-CSCF 104 can relay the message to the UE 102.

It should be noted that if guard timer 2 is shorter than guard timer 1, guard timer 2 may expire before guard timer 1 (e.g., when a UE 102 is rapidly pinging the network). In this case, the system 400 can take at least two courses of action. The first, discussed above, is to reset both the guard timers and the guard counter when guard timer 2 expires. The second is to reset guard timer 2 when it expires and guard timer 1 when it expires—and leave the UE 102 quarantined until both guard timers have reset. This obviously results in different quarantine times for different scenarios based on what the guard timers are set to and when the UE 102 exceeds the guard counter. Some possible scenarios are shown below in Table 1:

TABLE 1

| Guard Timer 1 | Guard Timer 2 | Guard Counter Exceeded Time | Quarantine Time if both Guard Timers Reset when Guard Timer 2 expires | Quarantine Time if both Guard Timers Must Expire |
|---|---|---|---|---|
| 30 sec | 15 sec | 1 sec | 15 sec | 29 sec |
| 30 sec | 15 sec | 14 sec | 15 sec | 16 sec |
| 30 sec | 15 sec | 29 sec | 15 sec | 15 sec |

In any of these scenarios, however, signaling traffic on the network is reduced significantly when compared to a UE 102 signaling unchecked, especially a UE 102 with malicious software.

Figure 5A:
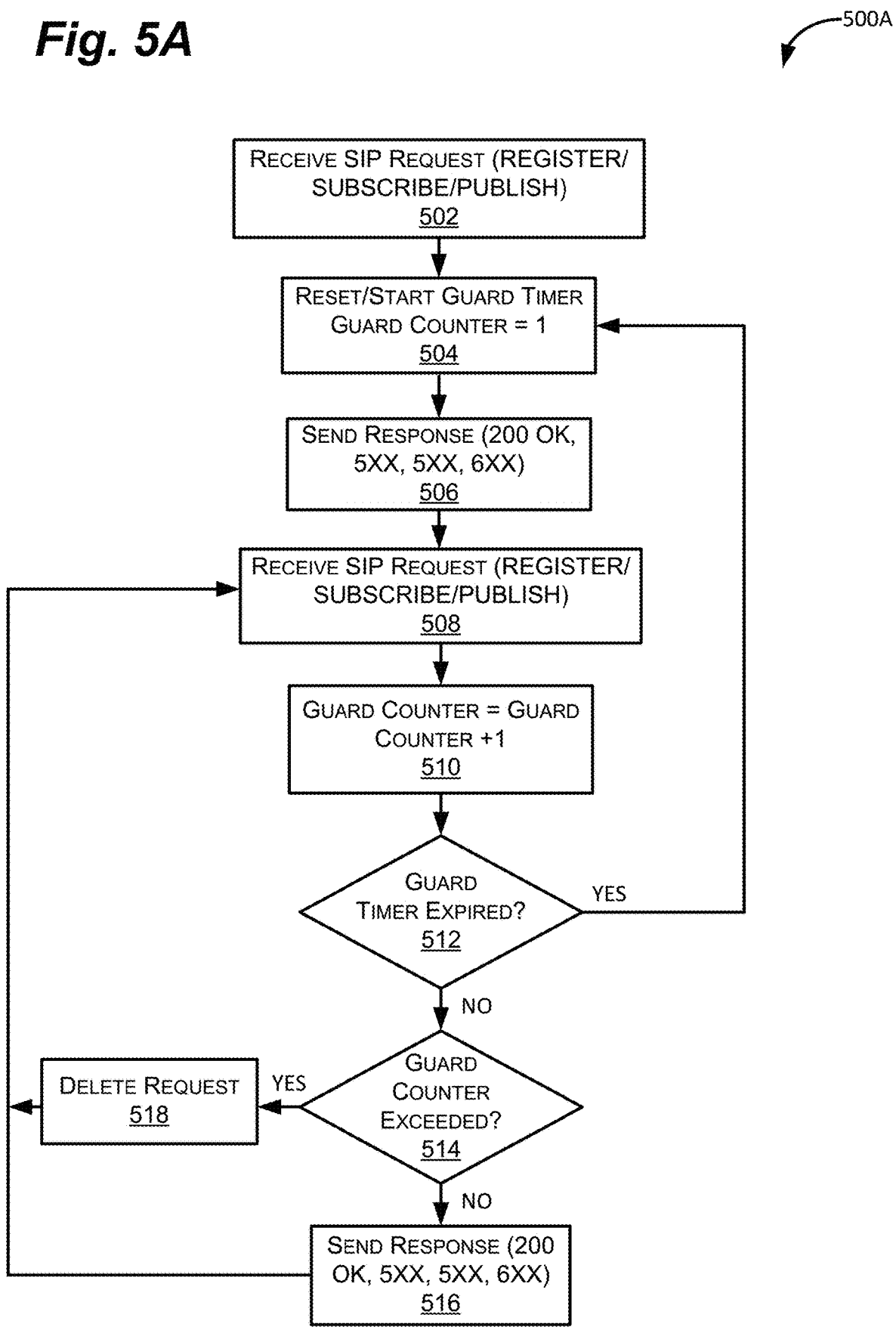
FIG. 5A is a flowchart depicting another example of a method for monitoring aggressive or attacking signaling using a guard timer and a guard counter, in accordance with some examples of the present disclosure.

As shown in FIG. 5A, examples of the present disclosure can also comprise a method 500A for using a guard counter in conjunction with a guard timer. In this manner, the UE 102 can send only a predetermined number of messages within a predetermined amount of time. After the predetermined number of messages is exceeded, any additional messages will be ignored by the network until the guard timer expires.

At 502, the network can receive a message from the UE. As before, this message can be any number of messages. In some examples, the message can comprise a SIP message requesting to register with the network, subscribe to a service, etc. And, while REGISTER, SUBSCRIBE, and PUBLISH are shown, the UE 102 can send other messages as well.

At 504, the network can start and/or reset the guard timer and set the guard counter to 1. If this is the first message from the UE, for example, the network can start the guard timer. If a previous guard timer has expired, on the other hand, the network can reset the guard timer to zero and restart it. In either case, the guard counter can be set to 1 (Counter=1) to indicate this is the first message for this guard timer. At 506, the network can send the appropriate response to the UE (e.g., a 200 OK or an error code).

At 508, the network can receive a second message from the UE. At 510, the network can increment the guard counter by one, in this case to Counter=2. At 512, the network can determine if the guard timer has expired. If the guard timer is set to 30 seconds and the second message is more than 30 seconds after the first message, for example, then it is not necessary to determine whether the guard counter has been exceeded. If the guard timer has expired, then at 504, the guard timer can be reset and the guard counter can be set back to 1 (Counter=1).

If, on the other hand, the guard timer has not expired, then at 514, the network can next determine if the guard counter has been exceeded. If the guard counter is set to two, for example, and this is the second message, then at 516, the network can send an appropriate response to the UE. If, on the other hand, the guard counter has been exceeded (e.g., this is the third message in this case), then at 518, the message can be ignored or deleted by the network. In either case, at 508, the network can receive another message from the UE and the method 500A repeats, incrementing the guard counter, deleting the request, etc., until the guard timer expires.

Of course, in some examples, the method 500A could stop incrementing the guard counter, at 510, until the guard timer has expired. In other words, during the time when the guard counter has been exceeded and the guard timer is still active (has not expired), the number of additional messages that come from the UE are somewhat irrelevant. Thus, in some examples, these messages can simply be ignored until the guard timer expires and the guard counter resets without updating the guard counter.

Thus, the method 500A enables the UE to send a predetermined number of messages in a predetermined amount of time. If the guard counter is set to three and the guard timer is set to 15 seconds, for example, then the UE can send three messages in the first 15 seconds, three messages in the second 15 seconds, and so on. Of course, in reality the system 500A would prevent three messages in any 15 second period using the appropriate guard timers. Thus, while not explicitly shown, with minor modification, the method could also limit the number of messages the UE can send in any time period. So, in the example above, the UE could be limited to sending three messages in any 15 second period, with a separate guard timer for each message.

Figure 5B:
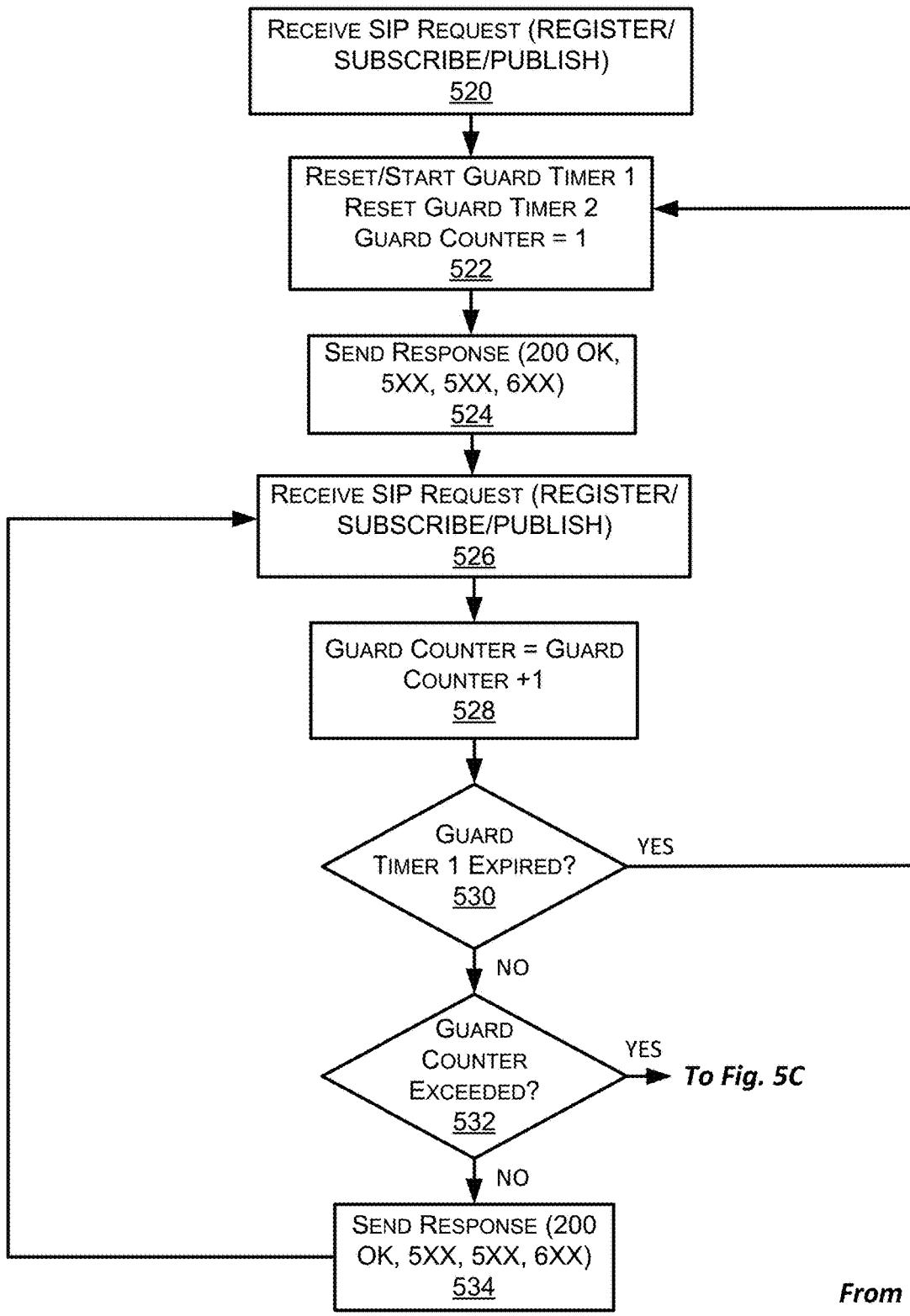

As shown in FIGS. 5B and 5C, examples of the present disclosure can also comprise a method 500B for utilizing multiple guard timers in conjunction with a guard counter. In this configuration, a UE can be allowed to send a predetermined number of messages within a predetermined amount of time (e.g., 5 messages in any 15 seconds). If the UE exceeds this limit, then the UE can be ignored by the system for a predetermined amount of time. As before, in some examples, when the UE is initially quarantined, the system may send a timer message to the UE in an attempt to prevent unnecessary signaling.

At 520, the network can receive a message from the UE. As before, this message can be any number of a variety of messages. In some examples, the message can comprise a SIP message requesting to register with the network, subscribe to a service, etc. And, while REGISTER, SUBSCRIBE, and PUBLISH are shown, the UE 102 can send other messages as well.

At 522, the network can reset and/or start a first guard timer (guard timer 1); reset, but not start, a second guard timer (guard timer 2); and set the guard counter to 1—in response to the first message. If this is an initial message from the UE, for example, the network can start guard timer 1. If this is another message in a series of messages from the UE, but a previous guard timer has expired, then the network can reset both guard timers to zero and restart guard timer 1. In either case, the guard counter can be set to 1 (Counter=1) to indicate this is the first message for the current guard timers. At 524, the network can send the appropriate response to the UE (e.g., a 200 OK or an error code).

At 526, the network can receive a second message from the UE. At 528, the network can increment the guard counter by one in this case to Counter=2. At 530, the network can determine if guard timer 1 has expired. If guard timer 1 is set to 30 seconds and the second message is more than 30 seconds after the first message, for example, then it is not necessary to determine whether the guard counter has been exceeded. If the guard timer has expired, then at 522, guard timer 1 can be reset/restarted and the guard counter can be set back to 1 (Counter=1) indicating the message is the first message for the reset guard timer 1.

If, on the other hand, guard timer 1 has not expired, then at 532, the network can next determine if the guard counter has been exceeded. If the guard counter is set to two (i.e., the UE is allowed to send two messages within the time set for the guard timer 1), for example, and this is the second message, then at 534, the network can send an appropriate response to the UE.

As shown in FIG. 5C, if, on the other hand, the guard counter has been exceeded, then at 536, guard timer 2 can be started. In this configuration, until guard timer 2 expires, additional messages can be ignored or deleted by the network. At 538, therefore, the network can ignore the message sent by the UE. In some examples, as mentioned above, for the initial message in excess of the guard counter, the network may send a timer message. The timer message can essentially tell the UE, "Do not send another message for X seconds," where X is equal to the time left on guard timer 2. As mentioned above, if the UE is responsive (as opposed to malicious or malfunctioning), this can prevent additional messaging until guard timer 2 expires.

At 540, the network can receive yet another message from the UE. At 542, the network can determine if guard timer 2 has expired. If guard timer 2 has not yet expired, then at 544, the network can simply delete the message. If the network has already sent a timer message (at 538) and the UE persists, then the network can determine that the UE is acting maliciously or malfunctioning and simply ignore it.

If guard timer 2 has expired, on the other hand, then at 522 (FIG. 5B), the network can reset and restart guard timer 1, reset guard timer 2, and set the guard counter to 1 to restart another "series" of messages. Thus, the UE is able to send a predetermined number of messages equal to the guard counter within a predetermined amount of time equal to guard timer 1. If the UE exceeds the guard counter, then the UE is ignored and/or quarantined for a predetermined time associated with guard timer 2.

As an example, if the guard counter is set to three, guard timer 1 is set to 20 seconds, and guard timer 2 is set to 15 seconds, then any UE sending more than three messages in any 20 second period will be ignored/quarantined for 15 seconds. If a UE only sends two messages in any 20 second period, for example, then guard timer 2 will never be invoked because guard timer 1 will reset beforehand. If a UE is abusively messaging (e.g., 4 messages/second) then it will send 4 messages, be quarantined/ignored for 15 seconds, send 4 messages, be quarantined/ignored for 15 seconds, etc. In this example, the number of messages responded to by the network—when compared to a current network with no guard timers or guard counters—is reduced by 15 times, significantly reducing signaling traffic.

FIG. 6 depicts a communications network 600 including a cellular network 628, a UE 602 (e.g., UE 102), and one or more IP networks 642, among other things. The cellular network 628 can include, for example, 2G 616, 3G 614, 4G long-term evolution (LTE) 612, and 5G 610 components. Of course, future technologies, such as, for example, internet of things (IoT) and device-to-device (D2D) components could also be included and are contemplated herein. As shown in FIG. 6, the guard counter and guard timer features could be implemented on the UE 602 in the form of a guard timer application 604 and/or a guard counter application 606. In other examples, these applications 604, 606 can be partially, or fully, implemented on a network entity (e.g., a guard timer/counter server 622), or a combination thereof.

In some examples, the UE 602 (e.g., UE 102) can include a guard timer application 604 and/or a guard counter application 606. In some examples, the two applications 604, 606 can be combined into a single application. Regardless, the applications 604, 606 can be used in conjunction with some, or all, of the systems 100A, 100B, 300A, 300B, 400 and methods 200, 500A, 500B discussed herein. In other words, rather than being implemented on the network side, the UE 602 can include one or more applications 604, 606 to prevent abusive signaling.

The applications 604, 606 can be used to replace or override factory settings, for example, that may tend to be abusive, if not necessarily maliciously. In other words, the end customer for a manufacturer of a UE 602 is the end user, not the network. Thus, a UE 602 may come from the manufacturer set to aggressively signal the network to improve the perceived performance of the UE 602 by the end user, or the Quality of Experience (QoE). Thus, if a user attempts to place a call, and the call initially fails, the UE 602 may be set to aggressively retry the call on the network to minimize the delay for the end user. Of course, this places additional strain on the network in exchange for possibly reducing the end user's wait time to place a call.

To this end, in some examples, the network provider and the manufacturer can collaborate to devise a method by which the needs of both the end user and the network provider are better accommodated. In some examples, the applications 604, 606 can enable the UE 602s to be partially, or completely, "self-policing." In other words, the methods 200, 500A, 500B discussed above could be implemented on the UE-side. In this configuration, the UE 602 can impose guard timer(s) and/or guard counters on itself to reduce or eliminate abusive signaling at the source.

Thus, if a manufacturer and a network provider agree to include a guard counter, guard timer 1, and guard timer 2, for example, in software on the UE 602, the method 500B discussed above in FIGS. 5B and 5C can be implemented by the UE 602, instead of the network. The applications 604, 606 can include, for example, a 5-message guard counter, a 10 second guard timer 1, and a 10 second guard timer 2. In this case, if the UE 602 sends more than 5 messages in any 10 second period, the applications 604, 606 can automatically stop sending messages for 10 seconds (e.g., regardless of user input or network responses).

In some examples, the method 500B can be implemented for all messages. This can prevent the aforementioned excessive signaling caused by registering every contact in the end users contact list, for example. In other words, even though the response from the network may be a 200 OK for each registration request, the UE 602 is nonetheless sending many messages in a short period of time, which may tend to overburden the network. In other examples, the method 500B can be implemented only when the responses from the network are associated with an error code (e.g., 4XX or 5XX error codes). In this configuration, the guard timer(s) and counters are not invoked when messages are approved/acknowledged (e.g., 200 OK), only when the UE 602 sends the applicable number of messages in the relevant period to which the network replies with error messages.

Of course, this is only one example, and any of the methods 200, 500A, 500B discussed herein could be implemented on the UE 602 in addition to, or instead of, on the network. In some examples, the applications 604, 606 can be included by the manufacturer, for example, some, or all, of the features of which may be dictated by individual network providers. Thus, the network providers can request more aggressive guard timers and/or counters to improve network performance, for example, or less aggressive guard timers and guard counters to improve UE 602 performance and QoE.

In other examples, the applications 604, 606 can be added by the network provider as part of the "OEM" software provided with the UE 602. In still other examples, the applications 604, 606 can be voluntarily downloaded and/or installed by users. This may enable the network provider to provide incentives (e.g., free bandwidth, faster connections, etc.) to users who use the applications 604, 606, in exchange for improved network performance.

In other examples, some, or all, of the systems 100A, 100B, 300A, 300B, 400 and methods 200, 500A, 500B discussed herein can be implemented on a network entity, such as the guard timer/counter server 622. In some examples, the guard timer/counter server 622 can be standalone. In other examples, many of the "back-end" components of the network 628 can handle some, or all, of these functions. Indeed, as described above, some, or all, of the aforementioned functions and the guard timer/counter server 622 could be located on one or more of, for example, the HLR/HSS 624, the P-CSCF 104 or the I/S-CSCF 106, or other components. In other words, some, or all, of the applications 604, 606 and/or the guard timer/counter server 622 can be installed on the UE 602, can be standalone, or can be integrated into one of the existing network components.

As is known in the art, data can be routed from the Internet or other sources using a circuit switched modem connection (or non-3GPP connection) 630, which provides relatively low data rates, or via IP based packet switched connections, which results in higher bandwidth. The 5G 610, 4G 612, and 3G 614 networks, which are purely IP based, enable data to go straight from the Internet to the service architecture evolution gateway (SAE GW) 632 to evolved Node B transceivers, enabling higher throughput. Many UEs 602 also have wireless local area network (WLAN) 618 capabilities, in some cases enabling even higher throughput.

The serving GPRS support node (SGSN) 634 is a main component of the general packet radio service (GPRS) network, which handles all packet switched data within the cellular network 628—e.g. the mobility management and authentication of the users. The MSC 636 is the primary service delivery node for global system for mobile communication (GSM) and code division multiple access (CDMA), responsible for routing voice calls and short messaging service (SMS) messages, as well as other services (such as conference calls, fax, and circuit switched data). The MSC 636 sets up and releases the end-to-end connection, handles mobility and hand-over requirements during the call, and takes care of billing and real time pre-paid account monitoring.

Similarly, the mobility management entity (MME) 638 is the key control-node for the 4G network 612. It is responsible for idle mode UE 602 paging and tagging procedures including retransmissions. The MME 638 is involved in the bearer activation/deactivation process and is also responsible for choosing the SAE GW 632 for the UE 602 at the initial attach and at time of intra-LTE handover involving core network (CN) node relocation (i.e., switching from one cell site to the next when traveling). The MME 638 is responsible for authenticating the user (by interacting with the HLR/HSS 624 discussed below). The non-access stratum (NAS) signaling terminates at the MME 638 and it is also responsible for generation and allocation of temporary identities to the UE 602. The MME 638 also checks the authorization of the UE 602 to camp on the service provider's home public land mobile network (HPLMN) or visiting public land mobile network (VPLMN) and enforces UE 602 roaming restrictions on the VPLMN. The MME 638 is the termination point in the network for ciphering/integrity protection for NAS signaling and handles the security key management. The MME 638 also provides the control plane function for mobility between 5G 610/4G 612 and 2G 616/3G 614 access networks with the S5 interface terminating at the MME 638 from the SGSN 634. The MME 638 also terminates the Sha interface towards the home HLR/HSS 624 for roaming UEs.

The HLR/HSS 624 is a central database that contains user-related and subscription-related information. The functions of the HLR/HSS 624 include functionalities such as mobility management, call and session establishment support, user authentication and access authorization. The HSS, which is used for LTE and 3G connections, is based on the previous HLR and authentication center (AuC) from CGMA and GSM technologies, with each serving substantially the same functions for their respective networks.

The policy and charging rules function (PCRF) 640 is a software node that determines policy rules in the cellular network 628. The PCRF 640 generally operates at the network core and accesses subscriber databases (e.g., the HLR/HSS 624) and other specialized functions, such as content handling (e.g., whether the user has sufficient data left in their plan), in a centralized manner. The PCRF 640 is the main part of the cellular network 628 that aggregates information to and from the cellular network 628 and other sources (e.g., IP networks 642). The PCRF 640 can support the creation of rules and then can automatically make policy decisions for each subscriber active on the cellular network 628. The PCRF 640 can also be integrated with different platforms like billing, rating, charging, and subscriber databases or can also be deployed as a standalone entity.

Finally, the 3GPP AAA server 626 performs authentication, authorization, and accounting (AAA) functions and may also act as an AAA proxy server. For WLAN 618 access to (3GPP) IP networks 642 the 3GPP AAA server 626 provides authorization, policy enforcement, and routing information to various WLAN 618 components. The 3GPP AAA server 626 can generate and report billing/accounting information, perform offline billing control for the WLAN 618, and perform various protocol conversions when necessary.

Figure 7:
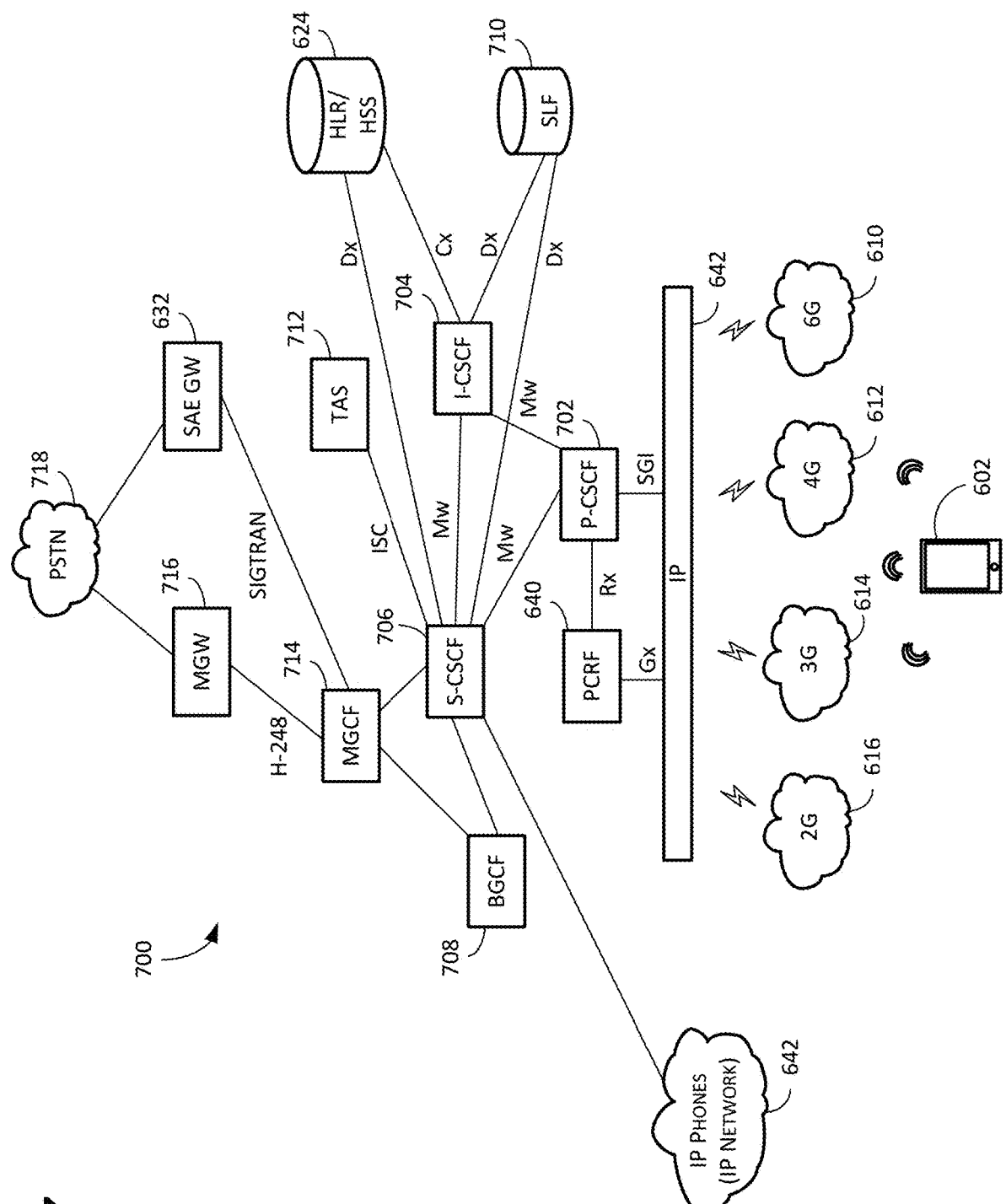
FIG. 7 is an example of an internet protocol multimedia subsystem (IMS) portion of the communications network of FIG. 6, in accordance with some examples of the present disclosure.

FIG. 7 includes a more detailed view of the components of the internet protocol multimedia subsystem (IMS) 700 for the 2G 616, 3G 614, 4G 612, and 5G 610 networks. As shown, the IMS 700 includes several network components for routing signals, storing subscriber information, and connecting across various subsystems and network types. The IMS 700 is built on SIP as the base to further support packaging of voice, video, data, fixed, and mobile services on a single platform to end users. It enables communications across multiple types of networks, including cellular, satellite, broadband, cable, fiber, and fixed networks, and enables the creation of efficient interoperating networks.

The IMS 700 also provides interoperability for the UE 602 and other devices across multiple platforms including, for example, 2G 616, 3G 614, 4G 612, 5G 610, and IP 542 networks. The IMS 700 also includes some components already discussed more generally in FIG. 6. These include, for example, the PCRF 640, HLR/HSS 624, and SAE GW 632.

The IMS 700 also includes a proxy-call session control function (P-CSCF) 702 (e.g., P-CSCF 104, discussed above). The P-CSCF 702 is the entry point to the IMS 700 and serves as the outbound proxy server for the UE 102. The UE 102 attaches to the P-CSCF 702 prior to performing IMS registrations and initiating SIP sessions. The P-CSCF 702 may be in the home domain of the IMS operator, or it may be in the visiting domain, where the UE 102 is currently roaming. For attachment to a given P-CSCF 702, the UE 102 performs P-CSCF 702 discovery procedures. Attachment to the P-CSCF 702 enables the UE 102 to initiate registrations and sessions with the IMS 700. As a result, the P-CSCF 702 is one possibility for implementing the systems 100A, 100B, 300A, 300B, 400 and methods 200, 500A, 500B discussed above.

The IMS 700 also includes an interrogating-call session control function (I-CSCF) 704—sometimes combined with the S-CSCF 706, discussed below, to form the I/S-CSCF (e.g., the I/S-CSCF 106). The I-CSCF 704 acts as an inbound SIP proxy server in the IMS 700. During IMS registrations, the I-CSCF 704 queries the HLR/HSS 624 to select the appropriate S-CSCF 706 (discussed below) which can serve the UE 102. During IMS 700 sessions, the I-CSCF 704 acts as the entry point to terminating session requests. The I-CSCF 704 routes the incoming session requests to the S-CSCF 706 of the called party.

The IMS 700 also includes a serving-call session control function (S-CSCF) 706 (e.g., I/S-CSCF 106). The S-CSCF 706 acts as a registrar server, and in some cases, as a redirect server. The S-CSCF 706 facilitates the routing path for mobile-originated or mobile-terminated session requests. The S-CSCF 706 also interacts with various components for playing tones and announcements, among other things. The S-CSCF 706 can receive initial filter criteria (IFCs) from the HLR/HSS 524 and establish the appropriate sessions with telephony application servers (TASs) 7122, among other things. As mentioned above, some, or all, of the systems 100A, 100B, 300A, 300B, 400 and methods 200, 500A, 500B discussed above could be implemented on the S-CSCF 706 or the I-CSCF 704 (or the combined I/S-CSCF 106).

The IMS 700 also includes a breakout gateway control function (BGCF) 708. The BGCF 708 is the IMS 700 element that selects the network in which the PSTN 718 (discussed below) breakout is to occur. If the breakout is to occur in the same network as the BGCF 708, for example, then the BGCF 708 selects a media gateway control function (MGCF) 714 (also discussed below) that will be responsible for interworking with the PSTN 718. The MGCF 714 then receives the SIP signaling from the BGCF 708.

The IMS 700 also includes a subscriber location function (SLF) 710. The SLF 710 provides information about the HLR/HSS 524 that is associated with a particular user profile. It is generally implemented using a database. If the IMS 700 contains more than one HLR/HSS 624, the I-CSCF 704 and S-CSCF 706 will communicate with SLF 710 to locate the appropriate HLR/HSS 624 based on the user profile.

The IMS 700 also includes one or more TASs 712. As the name implies, the TAS 712, sometimes known in the telephony-only context only as an application server (AS), is a component used to provide telephony applications and additional multimedia functions. The TAS 712 can include any entity in a telephone network that carries out functions that are not directly related to the routing of messages through the network. Such functions can include, for example, in-network answering machines, automatic call forwarding, conference bridges and other types of applications. And, while shown as a single entity in FIG. 7, multiple TASs 712 are generally used to provide multiple services. Based on the IFC provided to the S-CSCF 706, for example, the S-CSCF 706 can establish sessions with one or more TASs 712, i.e., one TAS 712 for each service in the IFC.

The IMS 700 also includes the MGCF 714. The MGCF 714 is a SIP endpoint that handles call control protocol conversion between SIP and ISDN user part (ISUP)/bearer-independent call control (BICC) and interfaces with the SAE GW 632 over stream control transmission protocol (SCTP). The MGCF 714 also controls the resources in a media gateway (MGW) 716 across an H.268 interface. The MGW 716 is a translation device or service that converts media streams between disparate telecommunications technologies such as POTS, SS7, next generation networks (2G 616, 3G 614, 4G 612, and 5G 610) or private branch exchange (PBX) systems.

Finally, the IMS 700 also includes a public switched telephone network (PSTN) 718. The PSTN 718 is the world's collection of interconnected voice-oriented public telephone networks, both commercial and government-owned. It is also referred to as the plain old telephone service (POTS). With respect to IP phones (on the IP network 642), for example, the PSTN 718 furnishes much of the Internet's long-distance infrastructure. Because internet service providers (ISPs) pay long-distance providers for access to their infrastructure and share the circuits among many users through packet-switching (discussed above), internet users avoid having to pay usage tolls to anyone other than their ISPs.

Figure 8:
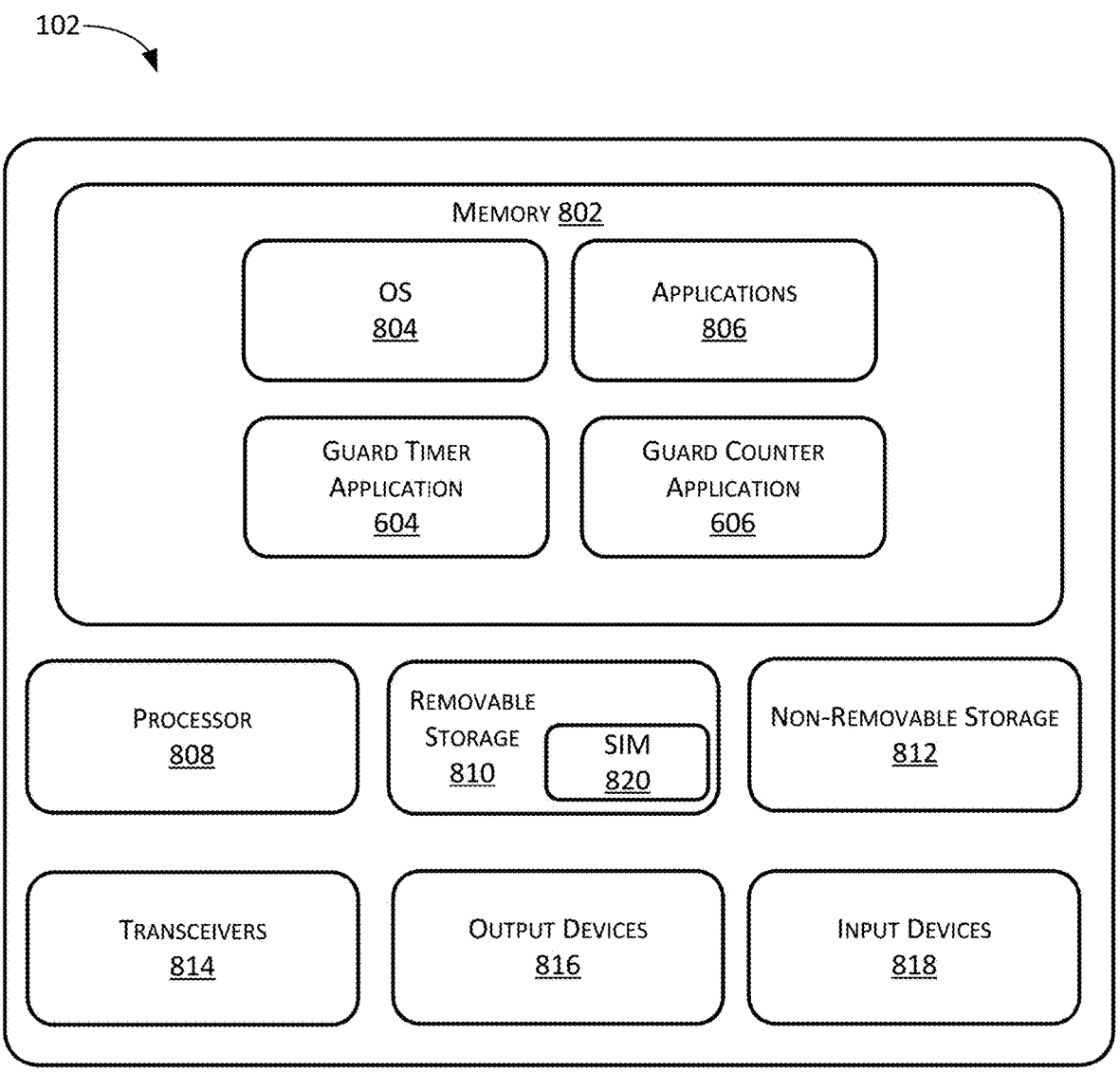
FIG. 8 is an example of a user equipment (UE) for use with the systems and methods disclosed herein, in accordance with some examples of the present disclosure.

FIG. 8 depicts a component level view of an example UE 102 for use with the systems 100A, 100B, 300A, 300B, 400 and methods 200, 500A, 500B described herein. For clarity, the UE 102 is described herein generally as a cell phone or smart phone. One of skill in the art will recognize, however, that the systems 100A, 100B, 300A, 300B, 400 and methods 200, 500A, 500B described herein can also be used with a variety of other electronic devices, such as, for example, tablet computers, laptops, desktops, and other network (e.g., cellular or IP network) connected devices. These devices are referred to collectively herein as the UE 102.

The UE 102 can comprise a number of components to execute the above-mentioned functions. As discussed below, the UE 102 can comprise memory 802 including an operating system 804 and common applications 806 such as, for example, contacts, calendar, call logs, voicemail, and e-mail, among other things. In some examples, the UE 102 can also comprise the guard timer application 604 and/or the guard counter application 606, discussed above. The UE 102 can also comprise one or more processors 808, one or more of removable storage 810, non-removable storage 812, transceiver(s) 814, output device(s) 816, and input device(s) 818.

In some examples, such as for cellular communication devices, the UE 102 can also include a subscriber identity module (SIM) 820 including an international mobile subscriber identity (IMSI), and other relevant information.

In various implementations, the memory 802 can be volatile (such as random access memory (RAM)), non-volatile (such as read only memory (ROM), flash memory, etc.), or some combination of the two. The memory 802 can include all, or part, of the applications 604, 606, 806 and the OS 804 for the UE 102, among other things. In some examples, some or all of the applications 604, 606, 806 and the OS 804 can also be stored on the SIM 820.

The memory 802 can also include the OS 804. Of course, the OS 804 varies depending on the manufacturer of the UE 102 and currently comprises, for example, iOS 11.2.6 for Apple products and Oreo for Android products. The OS 804 contains the modules and software that support a computer's basic functions, such as scheduling tasks, executing applications, and controlling peripherals. The OS 804 can also enable the UE 102 to send and retrieve data via an internet connection and perform other functions.

The UE 102 can also comprise one or more standard applications 806. The applications 806 can include those "factory" applications normally included with UEs. These can include, for example, e-mail applications for sending and receiving e-mail, contacts to store the user's contacts, calendar functions, web browsers, etc. The applications 806 can also include applications downloaded from the Internet, from an "app" store, or from other sources.

The UE 102 can also comprise one or more processors 808. In some implementations, the processor(s) 808 can be a central processing unit (CPU), a graphics processing unit (GPU), or both CPU and GPU, or any other sort of processing unit. The UE 102 may also include additional data storage devices (removable and/or non-removable) such as, for example, magnetic disks, optical disks, or tape. Such additional storage is illustrated in FIG. 8 by removable storage 810 and non-removable storage 812. The removable storage 810 and non-removable storage 812 can store some, or all, of the applications 604, 606, 806 and/or OS 804.

Non-transitory computer-readable media may include volatile and nonvolatile, removable and non-removable tangible, physical media implemented in technology for storage of information, such as computer readable instructions, data structures, program modules, or other data. The memory 802, removable storage 810, and non-removable storage 812 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other tangible, physical medium which can be used to store the desired information and which can be accessed by the UE 102. Any such non-transitory computer-readable media may be part of the UE 102 or may be a separate database, databank, remote server, or cloud-based server.

In some implementations, the transceiver(s) 814 include any sort of transceivers known in the art. In some examples, the transceiver(s) 814 can include wireless modem(s) to facilitate wireless connectivity with the other UE, the Internet, and/or an intranet via the cellular network 628 or IP network 642. Further, the transceiver(s) 814 may include a radio transceiver that performs the function of transmitting and receiving radio frequency communications via an antenna (e.g., Wi-Fi or Bluetooth®). In other examples, the transceiver(s) 814 may include wired communication components, such as a wired modem or Ethernet port, for communicating with the other UE or the provider's internet-based network.

In some implementations, the output device(s) 816 include any sort of output devices known in the art, such as a display (e.g., a liquid crystal or thin-film transistor (TFT) display), a touchscreen display, speakers, a vibrating mechanism, or a tactile feedback mechanism. In some examples, the output devices can play various sounds based on, for example, whether the UE 102 is being ignored, for example, or when the guard timer is in effect, the guard timer expires, the guard counter has been exceeded, or the guard counter has been reset. The output device(s) 816 can also play different sounds when receiving an incoming call or text message. The output device(s) 816 can also play sounds and/or display messages in response to the start of, or successful completion of, downloads. Output device(s) 816 also include ports for one or more peripheral devices, such as headphones, peripheral speakers, or a peripheral display.

In various implementations, input device(s) 818 include any sort of input devices known in the art. For example, the input device(s) 818 may include a camera, a microphone, a keyboard/keypad, or a touch-sensitive display. A keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like. In some examples, the UE 102 can include a touchscreen, for example, to enable the user to make selections (e.g., from the applications 806) directly on the touchscreen.

In the case of cellular-connected UE, the UE 102 can also include the SIM 820. The SIM 820 can include various information about the user's account including, for example, an international mobile subscriber identity (IMSI). The IMSI, in turn, can include various information related to the country (mobile country code, or MCC) network provider (mobile network code, or MNC), and the mobile station international subscriber directory number (MSISDN). This information can be used by the cellular network 628 to determine whether the UE 102 is a home UE or a roaming UE and associate the UE 102 with a user's account. And, while shown as removable storage in FIG. 8, the SIM 820 can also include an integrated component such as, for example, an embedded SIM (e-SIM).

Figure 9:
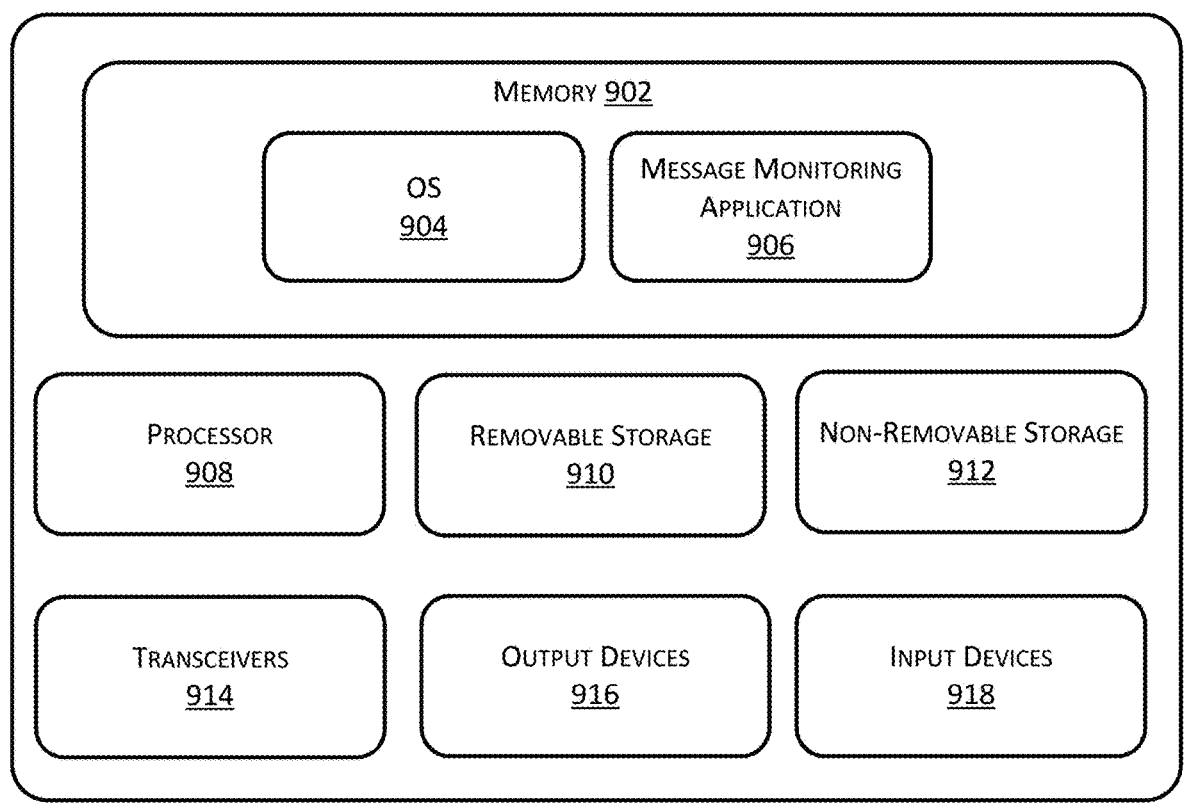
FIG. 9 is an example of a guard timer/counter server for use with the systems and methods disclosed herein, in accordance with some examples of the present disclosure.

As shown in FIG. 9, some, or all, of the functions associated with the systems 100A, 100B, 300A, 300B, 400 and methods 200, 500A, 500B discussed above can be implemented by the guard timer/counter server 622. For clarity, the guard timer/counter server 622 is described herein as a standalone server. One of skill in the art will nonetheless recognize that the various components of the systems 100A, 100B, 300A, 300B, 400 and methods 200, 500A, 500B described herein could be located in various other components of the cellular network 628. Thus, this simplified example of the guard timer/counter server 622 is intended only to simplify the discussion and not to limit the disclosure. The guard timer/counter server 622 can also be included as part of an existing network entity such as for example, the 3GPP AAA server 626, the P-CSCF 702, the I-CSCF 704, or the S-CSCF 706, or can be implemented on a cloud server, among other things.

The guard timer/counter server 622 can comprise a number of components to execute the above-mentioned systems 100A, 100B, 300A, 300B, 400 and methods 200, 500A,

500B. As discussed below, the guard timer/counter server 622 can comprise memory 902 including, for example, an OS 904 and a message monitoring application 906, among other things. In various implementations, the memory 902 can be volatile (such as RAM), non-volatile (such as ROM, flash memory, etc.), or some combination of the two. The memory 902 can also include the OS 904. Of course, the OS 904 varies depending on the manufacturer of the guard timer/counter server 622 and the type of component. Many servers, for example, run Linux or Windows Server. Dedicated cellular routing servers may run specific telecommunications OSs. The OS 904 contains the modules and software that support a computer's basic functions, such as scheduling tasks, executing applications, and controlling peripherals.

In this case, the guard timer/counter server 622 can also include the message monitoring application 906. As discussed above, the message monitoring application 906 can enable the guard timer/counter server 622 to perform the methods 200, 500A, 500B for controlling aggressive or abusive messaging from UEs 102. Thus, the guard timer/counter server 622 can receive registration requests from the UEs 102, monitor conditions on the network, set guard timer and guard counter parameters, and manage messaging from UEs 102. Thus, the guard timer/counter server 622 may monitor traffic via the SAE GW 632 and other network entities to reset guard counter or guard timer parameters in response to network traffic.

The guard timer/counter server 622 can also comprise one or more processors 908. In some implementations, the processor(s) 908 can be a central processing unit (CPU), a graphics processing unit (GPU), or both CPU and GPU, or any other sort of processing unit. The guard timer/counter server 622 can also include one or more of removable storage 910, non-removable storage 912, transceiver(s) 914, output device(s) 916, and input device(s) 918.

The guard timer/counter server 622 may also include additional data storage devices (removable and/or non-removable) such as, for example, magnetic disks, optical disks, or tape. Such additional storage is illustrated in FIG. 9 by removable storage 910 and non-removable storage 912. The removable storage 910 and non-removable storage 912 can store some, or all, of the OS 904 and the message monitoring application 906.

Non-transitory computer-readable media may include volatile and nonvolatile, removable and non-removable tangible, physical media implemented in technology for storage of information, such as computer readable instructions, data structures, program modules, or other data. The memory 902, removable storage 910, and non-removable storage 912 are all examples of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired information and which can be accessed by the guard timer/counter server 622. Any such non-transitory computer-readable media may be part of the guard timer/counter server 622 or may be a separate database, databank, remote server, or cloud-based server.

In some implementations, the transceiver(s) 914 include any sort of transceivers known in the art. In some examples, the transceiver(s) 914 can include wireless modem(s) to facilitate wireless connectivity with the UE 102, the Internet, the cellular network 628, and/or an intranet via a cellular connection. Further, the transceiver(s) 914 may include a radio transceiver that performs the function of transmitting and receiving radio frequency communications via an antenna (e.g., Wi-Fi or Bluetooth®) to connect to the IP network 642. In other examples, the transceiver(s) 914 may include wired communication components, such as a wired modem or Ethernet port, for communicating with the UE 102, the SAE GW 632, or other entities in the cellular network 628 or IP network 642.

In some implementations, the output device(s) 916 include any sort of output devices known in the art, such as a display (e.g., a liquid crystal or thin-film transistor (TFT) display), a touchscreen display, speakers, a vibrating mechanism, or a tactile feedback mechanism. In some examples, the output devices can play various sounds based on, for example, whether the guard timer/counter server 622 starts a guard timer, ignores a request, etc. Output device(s) 916 also include ports for one or more peripheral devices, such as headphones, peripheral speakers, or a peripheral display.

In various implementations, input device(s) 918 can include any sort of input devices known in the art. For example, the input device(s) 918 may include a camera, a microphone, a keyboard/keypad, or a touch-sensitive display. A keyboard/keypad may be a standard push button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

While several possible examples are disclosed above, examples of the present disclosure are not so limited. For instance, while the systems and methods above are discussed with reference to use with cellular and IP communications, the systems and methods can be used with other types of wired and wireless communications where aggressive or attacking messaging can affect network performance. In addition, while various functions are discussed as being performed on the guard timer/counter server 622 and/or by the UE 102, other components could perform the same or similar functions without departing from the spirit of the invention. In addition, while the disclosure is primarily directed to monitoring SIP messaging on IMS networks, the system could obviously be used in a similar manner on other types of networks and with other messaging protocols, including future networks and protocols.

Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A method comprising:
   receiving, at a transceiver of a network entity, a first request from a user equipment (UE);
   sending, at the transceiver, a first response to the UE;
   determining that the UE is unregistered;
   starting, in response to determining that the UE is unregistered and at a processor of the network entity, a guard timer in response to receiving the first request;
   after starting the guard timer, receiving, at the transceiver, a second request from the UE;
   determining, at the processor, that the guard timer has not expired;
   deleting, at the processor, the second request when the guard timer has not expired; and determining, at the processor, whether the UE is registered with a network associated with the network entity;
setting, with the processor, the guard timer equal to a first time when the UE is registered with the network;
setting, with the processor, the guard timer equal to a second time when the UE is not registered with the network; wherein the first time is shorter than the second time.

2. The method of claim 1, wherein the second request is deleted, the method further comprising:
receiving, at the transceiver, a third request from the UE;
determining, at the processor, that the guard timer has expired; and
sending, at the transceiver, a second reply to the UE in response to the third request.

3. The method of claim 1, wherein the second request is deleted, the method further comprising:
receiving, at the transceiver, a third request from the UE;
determining, at the processor, that the guard timer has not expired; and
deleting, at the processor, the third request.

4. The method of claim 1, wherein the first request and the second request comprise one of a REGISTER, SUBSCRIBE, or PUBLISH session initiation protocol (SIP) message.

5. The method of claim 1, wherein the network entity comprises a proxy call session control function (P-CSCF).

6. The method of claim 1, wherein the network entity comprises a serving call session control function (S-CSCF).

7. A method comprising:
receiving, at a transceiver of a network entity, a first request from a user equipment (UE);
sending, at the transceiver, a first response to the UE;
starting, at a processor of the network entity, a guard timer in response to the first request;
incrementing, at a processor, a guard counter by one in response to the first request;
receiving, at the transceiver, a second request from the UE;
incrementing, at the processor, the guard counter by one in response to the second request;
determining, at the processor, that the guard counter has been exceeded and that the guard timer has not expired;
deleting, with the processor, the second request when the guard counter has been exceeded and the guard timer has not expired; and
determining, at the processor, whether the UE is registered with a network associated with the network entity;
setting, at the processor, the guard counter equal to a first number when the UE is registered with the network;
setting, at the processor, the guard counter equal to a second number when the UE is not registered with the network; wherein the first number is higher than the second number.

8. The method of claim 7, wherein, before the guard counter has been exceeded, the method further comprising:
receiving, at the transceiver, a third request from the UE;
incrementing, at the processor, the guard counter by one in response to the third request;
determining, at the processor, that the guard counter has not been exceeded; and
sending, at the transceiver, a third response to the UE in response to the third request.

9. The method of claim 7, wherein before the guard counter has been exceeded, the method further comprising:
receiving, at the transceiver, a third request from the UE;
incrementing, at the processor, the guard counter by one in response to the third request;
determining, at the processor, that the guard counter has been exceeded; and
deleting, at the processor, the third request.

10. The method of claim 7, further comprising:
determining, at the processor, that the guard timer has expired; and
resetting, at the processor, the guard counter to zero.

11. The method of claim 7, wherein the network entity comprises a proxy call session control function (P-CSCF).

12. A network entity comprising:
a transceiver to send and receive wired transmissions, wireless transmissions, or both wired transmissions and wireless transmissions;
memory storing at least a signal monitoring application; and
a processor in communication with at least the transceiver and the memory, the signal monitoring application including computer-executable instructions to cause the processor to:
receive, at the transceiver, a first request from a user equipment (UE);
send, at the transceiver, a first response to the UE;
determining that the UE is unregistered;
start, at the processor, a guard timer in response to receiving the first request and determining that the UE is unregistered;
after starting the guard timer, receive, at the transceiver, a second request from the UE;
determine, at the processor, that the guard timer has not expired; and delete, at the processor, the second request when the guard timer has not expired; and
determining, at the processor, whether the UE is registered with a network associated with the network entity;
setting, with the processor, the guard timer equal to a first time when the UE is registered with the network;
setting, with the processor, the guard timer equal to a second time when the UE is not registered with the network; wherein the first time is shorter than the second time.

13. The network entity of claim 12, wherein the second request is deleted, the signal monitoring application further causing the processor to:
receive, at the transceiver, a third request from the UE;
determine, at the processor, that the guard timer has expired; and
send, at the transceiver, a second reply to the UE in response to the third request.

14. The network entity of claim 12, wherein the second request is deleted, the signal monitoring application further causing the processor to:
receiving, at the transceiver, a third request from the UE;
determining, at the processor, that the guard timer has not expired; and
deleting, at the processor, the third request.

15. The network entity of claim 12, wherein the network entity comprises a proxy call session control function (P-CSCF).

16. The network entity of claim 12, wherein the network entity comprises a serving call session control function (S-CSCF).

17. The network entity of claim 12,
wherein the first request comprises a REGISTER request;

wherein the first response comprises a SIP 200 OK; and
wherein the signal monitoring application further causes the processor to:
  set, with the processor, the guard timer equal to a registered guard timer.

18. The network entity of claim 12,
wherein the first request comprises a REGISTER request;
wherein the first response comprises an error code; and
wherein the signal monitoring application further causes the processor to:
set, with the processor, the guard timer equal to an unregistered guard timer.

* * * * *